US012469783B2

(12) United States Patent
MacFaden et al.

(10) Patent No.: US 12,469,783 B2
(45) Date of Patent: Nov. 11, 2025

(54) COMMUNICATION BETWEEN STACKED DIE

(71) Applicant: Graphcore Limited, Bristol (GB)

(72) Inventors: Alexander MacFaden, Cheltenham (GB); Stephen Felix, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 544 days.

(21) Appl. No.: 17/936,153

(22) Filed: Sep. 28, 2022

(65) Prior Publication Data

US 2023/0023957 A1 Jan. 26, 2023

Related U.S. Application Data

(63) Continuation-in-part of application No. 17/447,369, filed on Sep. 10, 2021, now Pat. No. 12,019,527.
(Continued)

(30) Foreign Application Priority Data

Oct. 8, 2021 (GB) ...................................... 2114440
Dec. 9, 2021 (GB) ...................................... 2117782

(51) Int. Cl.
*H01L 23/528* (2006.01)
*G06F 13/20* (2006.01)
(Continued)

(52) U.S. Cl.
CPC ............ *H01L 23/528* (2013.01); *G06F 13/20* (2013.01); *H01L 24/16* (2013.01);
(Continued)

(58) Field of Classification Search
CPC ... H01L 23/528; H01L 24/16; H01L 25/0657; G06F 13/20
See application file for complete search history.

(56) References Cited

U.S. PATENT DOCUMENTS 7,636,835 B1 * 12/2009 Ramey ................. H04L 49/109
712/18
7,925,816 B2 * 4/2011 Olesinski ............ G06F 13/4022
710/316
(Continued)

FOREIGN PATENT DOCUMENTS

CN 110134974 A * 8/2019 ............... G06F 1/22
EP 3522376 A1 * 8/2019 ............... G06F 1/22
(Continued)

OTHER PUBLICATIONS

Search Report dated Nov. 2, 2021 for United Kingdom Patent Application No. GB2114440.7. 19 pages.
(Continued)

*Primary Examiner* — Laura M Menz
(74) *Attorney, Agent, or Firm* — HAYNES AND BOONE, LLP

(57) ABSTRACT

In a stacked integrated circuit device, there are two components, one in a first of the die and another in a second of the die. Each of the components is provided with two output connections, one leading above and one leading below the die, and two input connections, one leading above and one leading below the die, either of the two die. As a result of the redundancy, both die may be used in either position in the stacked structure. If either of the die is used as the top die, it sends data on its second output path and receives data on its second input path. On the other hand, when one of the die is used as the bottom die, it sends data on its first output path and receives data on its first input path. In this way, the same design may be used for the connections between each of the die.

27 Claims, 20 Drawing Sheets

Related U.S. Application Data which is a continuation-in-part of application No. 16/395,363, filed on Apr. 26, 2019, now Pat. No. 11,119,873.

(51) Int. Cl.
    *H01L 23/00*         (2006.01)
    *H01L 25/065*       (2023.01)

(52) U.S. Cl.
    CPC ...... *H01L 25/0657* (2013.01); *G06F 2213/40* (2013.01); *H01L 2224/16145* (2013.01)

(56) References Cited

U.S. PATENT DOCUMENTS

| | | | |
|---|---|---|---|
| 8,298,914 B2 * | 10/2012 | Farooq | H01L 25/0657 438/455 |
| 8,399,336 B2 * | 3/2013 | Farooq | H01L 25/50 438/455 |
| 8,664,081 B2 * | 3/2014 | Farooq | H01L 25/50 438/455 |
| 9,564,394 B1 * | 2/2017 | Roth | H01L 21/768 |
| 10,445,278 B2 * | 10/2019 | Schulz | H01L 23/49838 |
| 10,658,335 B2 * | 5/2020 | Gu | H01L 25/105 |
| 10,797,037 B1 * | 10/2020 | Lin | H01L 25/50 |
| 10,804,255 B1 * | 10/2020 | Agarwal | H03K 19/018507 |
| 11,004,829 B2 * | 5/2021 | Vodrahalli | H01L 25/50 |
| 11,107,799 B1 * | 8/2021 | Alapati | H01L 23/49827 |
| 11,119,873 B2 * | 9/2021 | Felix | G06F 11/2028 |
| 11,211,279 B2 * | 12/2021 | Or-Bach | H10D 30/711 |
| 11,394,386 B2 * | 7/2022 | Lin | H01L 23/5384 |
| 11,443,091 B1 * | 9/2022 | McColgan | G06F 30/343 |
| 11,670,589 B2 * | 6/2023 | Teh | H01L 23/5382 257/737 |
| 11,709,794 B2 * | 7/2023 | Felix | G06F 15/80 712/29 |
| 11,837,268 B1 * | 12/2023 | Dokania | H10B 12/20 |
| 11,903,219 B1 * | 2/2024 | Dokania | H10D 1/682 |
| 11,910,618 B1 * | 2/2024 | Dokania | H10B 61/22 |
| 11,955,153 B1 * | 4/2024 | Dokania | G11C 11/1659 |
| 11,978,762 B1 * | 5/2024 | Dokania | G11C 11/1659 |
| 11,997,853 B1 * | 5/2024 | Dokania | H10B 53/10 |
| 12,001,367 B2 * | 6/2024 | Noguera Serra | G06F 13/4027 |
| 12,019,527 B2 * | 6/2024 | Felix | G06F 11/27 |
| 12,032,021 B2 * | 7/2024 | Felix | G01R 31/318536 |
| 12,041,785 B1 * | 7/2024 | Dokania | H10B 63/84 |
| 12,087,730 B1 * | 9/2024 | Dokania | G11C 11/2255 |
| 12,096,638 B2 * | 9/2024 | Dokania | G11C 11/2273 |
| 12,108,609 B1 * | 10/2024 | Dokania | H10B 53/30 |
| 12,171,103 B1 * | 12/2024 | Dokania | G11C 11/223 |
| 2006/0001176 A1 * | 1/2006 | Fukaishi | G11C 5/02 257/777 |
| 2010/0047964 A1 * | 2/2010 | Farooq | H01L 25/50 700/121 |
| 2010/0144094 A1 * | 6/2010 | Chen | H01L 21/6835 438/109 |
| 2010/0314711 A1 * | 12/2010 | Farooq | H01L 21/6835 438/455 |
| 2012/0309127 A1 * | 12/2012 | Farooq | H01L 25/50 438/107 |
| 2013/0024737 A1 * | 1/2013 | Marinissen | G01R 31/318511 714/E11.155 |
| 2014/0175667 A1 * | 6/2014 | Lee | H01L 23/481 257/774 |
| 2015/0187439 A1 * | 7/2015 | Querbach | G06F 11/263 714/719 |
| 2016/0211241 A1 * | 7/2016 | Law | G11C 29/48 |
| 2016/0363626 A1 * | 12/2016 | How | H01L 25/0652 |
| 2018/0165396 A1 * | 6/2018 | Lin | G11C 7/106 |
| 2018/0181524 A1 * | 6/2018 | Schulz | G06F 13/4045 |
| 2019/0164856 A1 * | 5/2019 | Byun | H01L 23/49827 |
| 2019/0304512 A1 * | 10/2019 | Narui | G11C 5/04 |
| 2020/0201704 A1 * | 6/2020 | Felix | G06F 11/2043 |
| 2021/0050300 A1 * | 2/2021 | Lin | H03K 19/018592 |
| 2021/0075423 A1 * | 3/2021 | Lin | H03K 19/17736 |
| 2021/0104493 A1 * | 4/2021 | Vodrahalli | H01L 25/0657 |
| 2021/0111116 A1 * | 4/2021 | Teh | H03K 19/17704 |
| 2021/0159108 A1 * | 5/2021 | Or-Bach | H10B 12/053 |
| 2021/0232744 A1 * | 7/2021 | Lin | H03K 3/356113 |
| 2021/0249385 A1 * | 8/2021 | Vodrahalli | H01L 24/48 |
| 2021/0406115 A1 * | 12/2021 | Felix | G06F 13/4022 |
| 2022/0229802 A1 * | 7/2022 | Felix | G06F 13/36 |
| 2022/0253399 A1 * | 8/2022 | Knowles | G06F 8/456 |
| 2023/0023957 A1 * | 1/2023 | Macfaden | G06F 11/27 |
| 2023/0079541 A1 * | 3/2023 | Felix | G06F 11/0724 712/208 |
| 2023/0114044 A1 * | 4/2023 | Felix | G01R 31/318536 714/725 |
| 2023/0116320 A1 * | 4/2023 | Felix | G01R 31/318536 257/686 |
| 2023/0244842 A1 * | 8/2023 | Lin | H10B 41/35 |
| 2023/0281370 A1 * | 9/2023 | Lin | G06F 30/34 716/110 |
| 2023/0284456 A1 * | 9/2023 | Dokania | H10B 53/50 257/5 |
| 2023/0289311 A1 * | 9/2023 | Noguera Serra | G06F 15/7825 |
| 2024/0135079 A1 * | 4/2024 | Lin | H03K 19/1776 |
| 2024/0194645 A1 * | 6/2024 | Young | H10D 89/10 |
| 2025/0077754 A1 * | 3/2025 | Lin | H03K 19/1776 |

FOREIGN PATENT DOCUMENTS

| | | | | |
|---|---|---|---|---|
| GB | 2569268 A | | 6/2019 | |
| GB | 2610610 A | * | 3/2023 | ......... G06F 13/4022 |
| GB | 2613662 A | * | 6/2023 | ............ H01L 25/50 |
| KR | 20220036955 A | * | 3/2022 | ............ H01L 24/16 |
| TW | 1399827 B | * | 6/2013 | ........ H01L 21/6835 |
| TW | 201426962 A | * | 7/2014 | ............ H01L 23/481 |
| TW | 202347696 A | * | 12/2023 | ............ H01L 24/13 |
| WO | WO-2010020437 A1 | * | 2/2010 | ............ H01L 25/50 |
| WO | WO-2010022163 A1 | * | 2/2010 | ............ H01L 24/11 |
| WO | WO-2018119153 A2 | * | 6/2018 | .......... H01Q 9/0414 |
| WO | 2021011115 A1 | | 1/2021 | |

OTHER PUBLICATIONS

Combined Search and Examination Report dated Oct. 9, 2019 for GB Patent Application No. GB1821137.5. 5 pages.
Combined Search and Examination Report dated Jul. 19, 2022 for GB Patent Application No. GB2114440.7. 16 pages.
Search Report dated May 11, 2022 for GB Patent Application No. GB2117782.9. 4 pages.

* cited by examiner

COMMUNICATION BETWEEN STACKED DIE

CROSS-REFERENCE TO RELATED APPLICATIONS

The present application is a Continuation-in-Part of U.S. patent application Ser. No. 17/447,369, filed Sep. 10, 2021, which is a continuation-in-part of U.S. patent application Ser. No. 16/395,363, filed Apr. 26, 2019, now U.S. Pat. No. 11,119,873 issued on Sep. 14, 2021. The present application further claims priority to United Kingdom Patent Application No. GB2117782.9, filed Dec. 9, 2021, and United Kingdom Patent Application No. GB2114440.7, filed Oct. 8, 2021. The aforementioned applications are hereby incorporated herein by reference in their entireties.

TECHNICAL FIELD

The present disclosure relates to a stacked integrated circuit device and in particular to a stacked integrated circuit device comprising a first component and a second component communicating with one another between different die of the device.

BACKGROUND

In the context of processing data for complex or high-volume applications, a work accelerator may be a subsystem to which processing of certain data is offloaded from a host system. Such a work accelerator may have specialised hardware for performing specific types of processing.

In particular, a work accelerator specialised for machine learning applications may have an architecture which supports a high degree of parallelism. One form of parallelism can be achieved by means of a processor comprising an arrangement of multiple tiles on the same chip (i.e. same die), each tile comprising its own respective processing unit and memory (including program memory and data memory). Thus, separate portions of program code can be run in parallel on different ones of the tiles. The tiles are connected together via an on-chip interconnect, which enables data to be exchanged between them. Such an accelerator may function as a subsystem for a host system to perform parallel processing of datasets provided to it.

One such specialised work accelerator is a so-called intelligence processing unit (IPU) developed by Graphcore and described in U.S. patent application Ser. No. 16/276,834, which is incorporated by reference. In this architecture, a plurality of processors are arranged in respective columns on the chip. The processing unit has an exchange fabric for exchanging messages between sending and receiving processors in a so-called time deterministic fashion.

An integrated circuit (which may be referred to as a 'chip') is a set of electronic circuits that are manufactured on a single piece of semiconductor material (e.g. silicon). Typically, integrated circuits are produced in large batches on a single large wafer of the semiconductor material, which is then cut into pieces, with each piece containing a copy of the integrated circuit. Each of these pieces is referred to as a die.

The electronic circuits of a die can be designed to provide one or more components for performing different functions. For example, the chip may comprise one or more central processing units (CPU), memories, peripheral interfaces, etc.

The IPU disclosed above is formed as part of an integrated circuit. Such a chip may also comprise circuitry for supporting the operation of the IPU, such as circuitry for linking the chip to a host.

SUMMARY

In order to provide devices having greater processing power for a given footprint, it is proposed to stack together multiple die, each of which comprises its own set of computer circuitry. Not only would such a stacked structure have increased processing power compared to a single logic die, but the communication between the die may be achieved with lower latency and higher bandwidth.

One problem that is encountered when stacking multiple such die is how to provide for communication between components of the stacked die whilst minimising the differences in design between the stacked die. For example, one way in which to implement connections between the components of two stacked die may be to design a bottom stacked die—having connections suitable only for connecting to the die above—and a top stacked die—having different connections suitable only for connecting to the die below. However, a requirement to provide substantially different sets of connections in the two die increases the complexity of the design process.

According to a first aspect, there is provided a stacked integrated circuit device comprising a plurality of die, wherein each of two or more of the plurality of die comprises: a plurality of metal layers; a component; and a plurality of connections associated with the component, the plurality of connections comprising: a first input path connecting to a top of the plurality of metals of the respective die; a second input path connected to a bottom of the plurality of metal layers of the respective die; a first output path connected to the top of the plurality of metals of the respective die; a second output path connected to the bottom of the plurality of metal layers of the respective die; wherein for a first die of the two or more die: the first input path is unconnected to a further one of the two or more die, so as to be inoperable for receiving data from any of the two or more die; the second input path provides a connection to the second die for receiving data from the component of the second die; the first output path is unconnected to a further one of the two or more die, so as to be inoperable for sending data to any of the two or more die; and the second output path provides a connection to the second die for sending data from the component of the first die to the second die; wherein for a second die of the two or more die: the first input path provides a connection to the first die for receiving data from the component of the first die; the second input path is unconnected to a further one of the two or more die, so as to be inoperable for receiving data from any of the two or more die; the first output path provides a connection to the first die for sending data from the component of the second die to the first die; and the second output path is unconnected to a further one of the two or more die, so as to be inoperable for sending data to any of the two or more die.

By providing each of the components with two output connections, one leading above and one leading below the die, and two input connections, one leading above and one leading below the die, either of the two die may be used in either position in the stacked structure. If either of the die is used as the top die, it sends data on its second output path and receives data on its second input path. On the other hand, when one of the die is used as the bottom die, it sends data on its first output path and receives data on its first input path. In this way, the same design may be used for the connections between each of the die.

According to a second aspect, there is provided a method implemented in a stacked integrated circuit device comprising a plurality of die, the plurality of die comprising a first die and a second die, the method comprising: in the first die: receiving via a second input path provided by a first plurality of wires, data from a second component of the second die; and sending to the second die via a second output path provided by the first plurality of wires, data from a first component of the first die; in the second die: receiving via a first input path provided by a second plurality of wires, data from the first component of the first die; and sending to the first die via a first output path provided by the second plurality of wires, data from the second component of the second die, wherein the first plurality of wires have a same layout as the second plurality of wires.

BRIEF DESCRIPTION OF THE DRAWINGS

For a better understanding of the present invention and to show how the same may be carried into effect reference will now be made by way of example to the following drawings.

DETAILED DESCRIPTION

The present disclosure relates to a stacked integrated circuit device. The stacked integrated circuit device may also be known as a three-dimensional integrated circuit device. Throughout this description, the device is referred to as the stacked device. The stacked device comprises two or more die, stacked one on top of the other. Each of the die comprise a processing unit comprising a plurality of processors. An example such processing unit is the IPU (Intelligence Processing Unit), so named to denote its adaptivity to machine intelligence applications. The IPU is described in more detail in U.S. application Ser. No. 16/276,834, which is incorporated by reference.

Firstly, an example processing unit 2 that may be implemented in each of the die of the stacked device is described.

Figure 1:
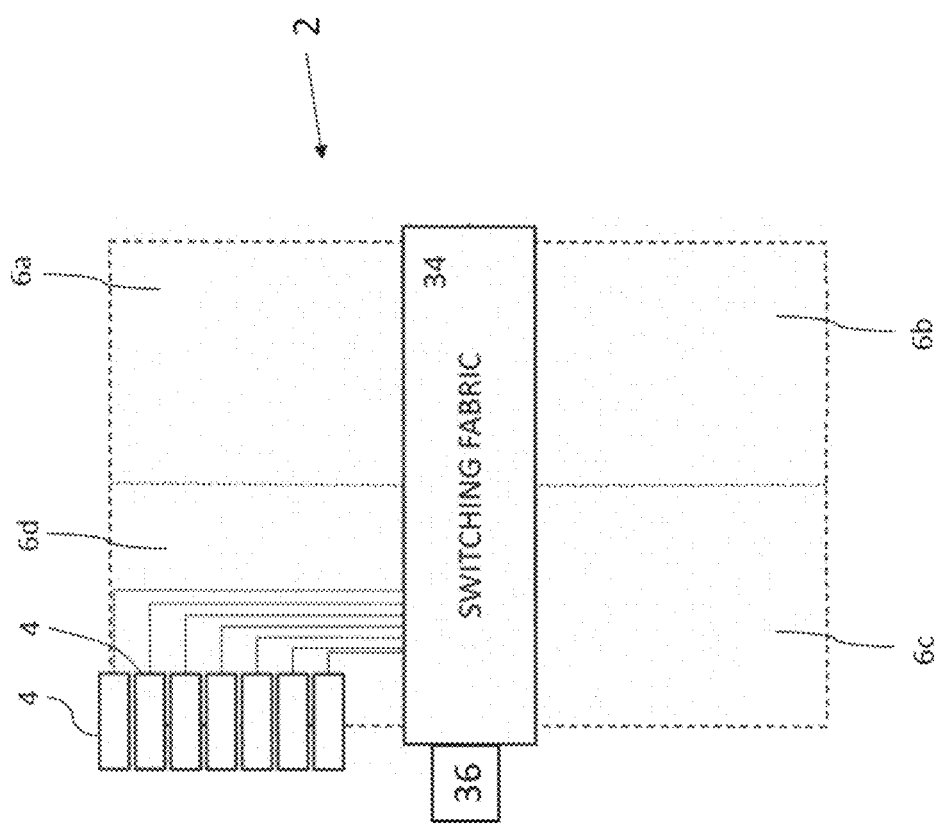
FIG. 1 illustrates an example of a processing unit comprising a plurality of processor tiles.

FIG. 1 illustrates schematically the architecture of an example processing unit 2. To form a larger computer, the processing units 2 can be connected together. The processing unit 2 comprises multiple processors, referred to herein as tiles 4. In one embodiment, there are 1216 tiles organised in arrays 6a, 6b, 6c, and 6d. The processing unit 2 can be considered as having East and West regions, and North and South regions. 6a may be referred to as "North East array", 6b may be referred to as "South East array", 6c may be referred to as "South West array", and 6d may be referred to as "North West array". In the described example, each array has four columns of 76 tiles (in fact generally there will be 80 tiles, for redundancy purposes). It will be appreciated that the concepts described herein extend to a number of different physical architectures—one example is given here to aid understanding.

The processing unit 2 receives work from a host (not shown), which is connected to the processing unit 2 via one of the chip-to-host links in the form of input data to be processed by the processing unit 2. A host may access a computer, which is architected as a single processing unit 2 or a group of multiple interconnected processing units 2 depending on the workload from the host application.

The processing unit 2 comprises a switching fabric 34 to which all tiles and links are connected by sets of connection wires, the switching fabric being stateless, i.e. having no program visible state. Each set of connection wires is fixed end to end. The wires are pipelined. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. The "packets" may be sent without destination identifiers which would permit an intended recipient to be uniquely identified. Instead, they may each represent a numerical or logical value input to or output from a tile. The packets may include headers indicating at least one direction of travel through the switching fabric 34, however. Each tile 4 has its own local memory (described later). The tiles 4 do not share memory. The switching fabric constitutes a cross set of connection wires connected to multiplexers and tiles, as described later, and does not hold any program visible state. The switching fabric is considered to be stateless and does not use any memory. Data exchange between tiles 4 may be conducted on a time deterministic basis as described herein. In this case, the switching fabric comprises a pipelined connection wire comprising a series of temporary stores, e.g. latches or flip flops, which hold datum for a clock cycle before releasing it to the next store. Time of travel along the wire is determined by these temporary stores, each one using up a clock cycle of time in a path between any two points.

Each column is associated with a respective group of exchange wires as described later. Columns using groups of wires physically closer to them have lower latencies for inter-column exchanges than a column using a group of wires which is located further away.

Figure 2:
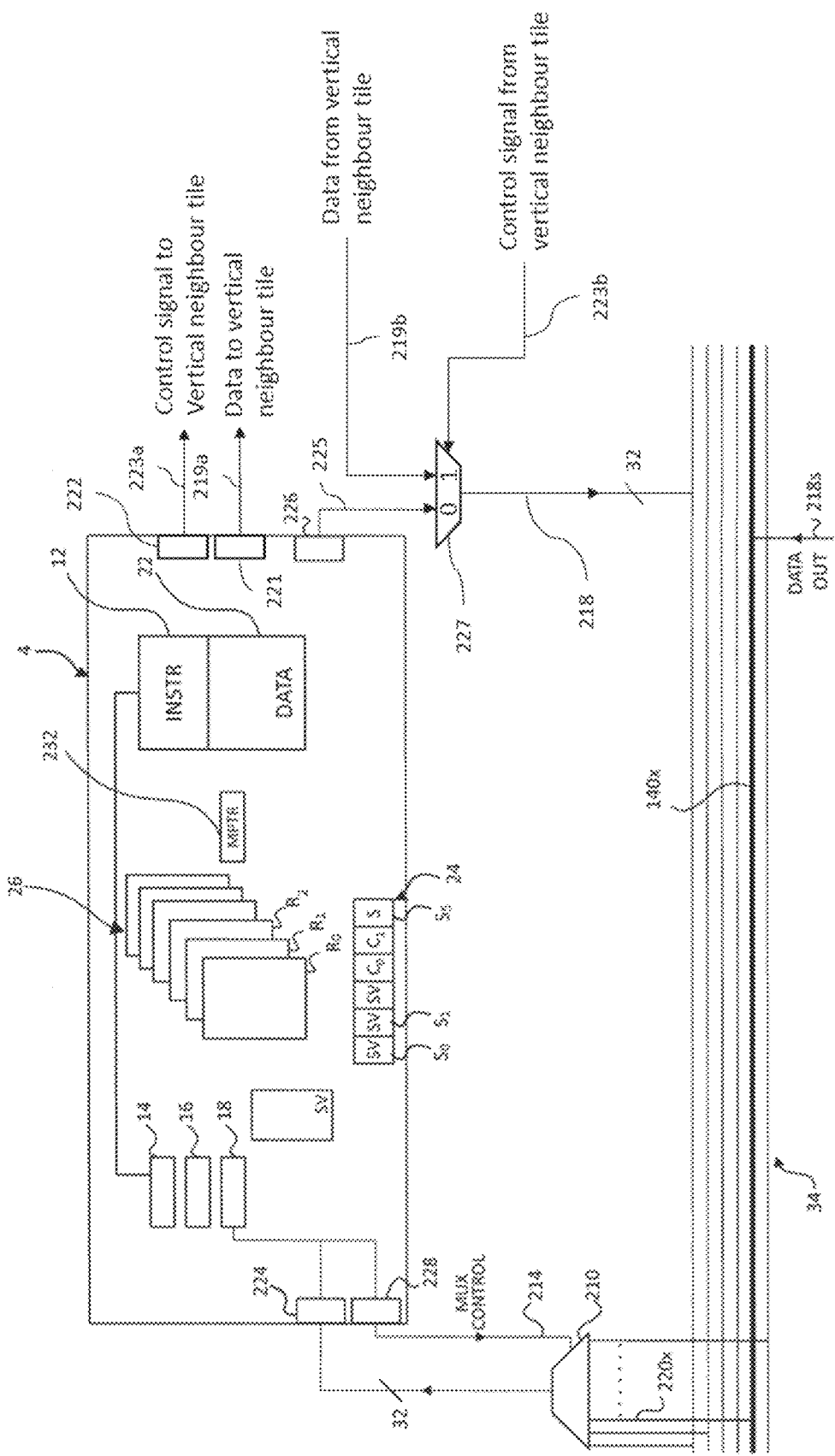
FIG. 2 is a schematic diagram of a tile connected to the switching fabric.

FIG. 2 illustrates an example tile 4 in accordance with embodiments of the present disclosure. In the tile, multiple threads are interleaved through a single execution pipeline. The tile 4 comprises: a plurality of contexts 26 each arranged to represent the state of a different respective one of a plurality of threads; a shared instruction memory 12 common to the plurality of threads; a shared data memory 22 that is also common to the plurality of threads; a shared execution pipeline 14, 16, 18 that is again common to the plurality of threads; and a thread scheduler 24 for scheduling the plurality of threads for execution through the shared pipeline in an interleaved manner. The thread scheduler 24 is schematically represented in the diagram by sequence of time slots $S_0 \ldots S_5$, but in practice is a hardware mechanism managing program counters of the threads in relation to their time slots. The execution pipeline comprises a fetch stage 14, a decode stage 16, and an execution stage 18 comprising an execution unit (EXU) and a load/store unit (LSU). Each of the contexts 26 comprises a respective set of registers $R_0$, $R_1$ ... for representing the program state of the respective thread.

The fetch stage 14 is connected to fetch instructions to be executed from the instruction memory 12, under control of the thread scheduler 24. The thread scheduler 24 is configured to control the fetch stage 14 to fetch instructions from the local program for execution in each time slot as will be discussed in more detail below.

The fetch stage 14 has access to a program counter (PC) of each of the threads that is currently allocated to a time slot. For a given thread, the fetch stage 14 fetches the next instruction of that thread from the next address in the instruction memory 12 as indicated by the thread's program counter. Note that an instruction as referred to herein, means a machine code instruction, i.e. an instance of one of the fundamental instructions of the computer's instruction set, made up of an opcode and zero or more operands. Note too that the program loaded into each tile is determined by a processor or compiler to allocate work based on the graph of the machine intelligence model being supported.

The fetch stage 14 then passes the fetched instruction to the decode stage 16 to be decoded, and the decode stage 16 then passes an indication of the decoded instruction to the execution stage 18 along with the decoded addresses of any operand registers of the current context specified in the instruction, in order for the instruction to be executed.

In the present example, the thread scheduler 24 interleaves threads according to a round-robin scheme whereby, within each round of the scheme, the round is divided into a sequence of time slots $S_0, S_1, S_2, S_3$, each for executing a respective thread. Typically, each slot is one processor cycle long and the different slots are evenly sized (though not necessarily so in all possible embodiments). This pattern then repeats, each round comprising a respective instance of each of the time slots (in embodiments in the same order each time, though again not necessarily so in all possible embodiments). Note, therefore, that a time slot as referred to herein means the repeating allocated place in the sequence, not a particular instance of the time slot in a given repetition of the sequence. In the illustrated embodiment, there are eight time slots, but other numbers are possible. Each time slot is associated with hardware resource, e.g. register, for managing the context of an executing thread.

One of the contexts 26, labelled SV, is reserved for a special function, to represent the state of a "supervisor" (SV) whose job it is to coordinate the execution of "worker" threads. The supervisor can be implemented as a program organised as one or more supervisor threads which may run concurrently. The supervisor thread may also be responsible for performing barrier synchronisations described later or may be responsible for exchanging data on and off the tile, as well as in and out of local memory so that is can be shared between the worker threads between computations. The supervisor thread implements exchange code, which is the instructions involved in exchanging data on and off the tile. The thread scheduler 24 is configured so as, when the program as a whole starts, to begin by allocating the supervisor thread to all of the time slots, i.e. so the supervisor SV starts out running in all time slots $S_0 \ldots S_5$. However, the supervisor thread is provided with a mechanism for, at some subsequent point (either straight away or after performing one or more supervisor tasks), temporarily relinquishing each of the slots in which it is running to a respective one of the worker threads $C_0$, $C_1$ denote slots to which a worker thread has been allocated. This is achieved by the supervisor thread executing a relinquish instruction.

Each worker thread is a codelet intended to represent a vertex in the graph and to execute atomically. That is all the data it consumes is available at launch and all the data it produces is not visible to other threads until it exits. It runs to completion (excepting error conditions). The data address may specify some data to be acted upon by the codelet. Alternatively, the relinquish instruction may take only a single operand specifying the address of the codelet, and the data address could be included in the code of the codelet; or the single operand could point to a data structure specifying the addresses of the codelet and data. Codelets may be run concurrently and independently of one another.

Each of the worker threads in slots $C_0$, $C_1$ performs its one or more computation tasks. At the end of its task(s), the worker thread then hands the time slot in which it is running back to the supervisor thread. This is achieved by the worker thread executing an exit instruction. This instruction acts on the thread scheduler 24 so that the time slot in which it is executed is returned back to the supervisor thread. The supervisor thread can then perform one or more supervisor subsequent tasks (e.g. barrier synchronization and/or exchange of data), and/or continue to execute another relinquish instruction, and so forth.

Figure 3:
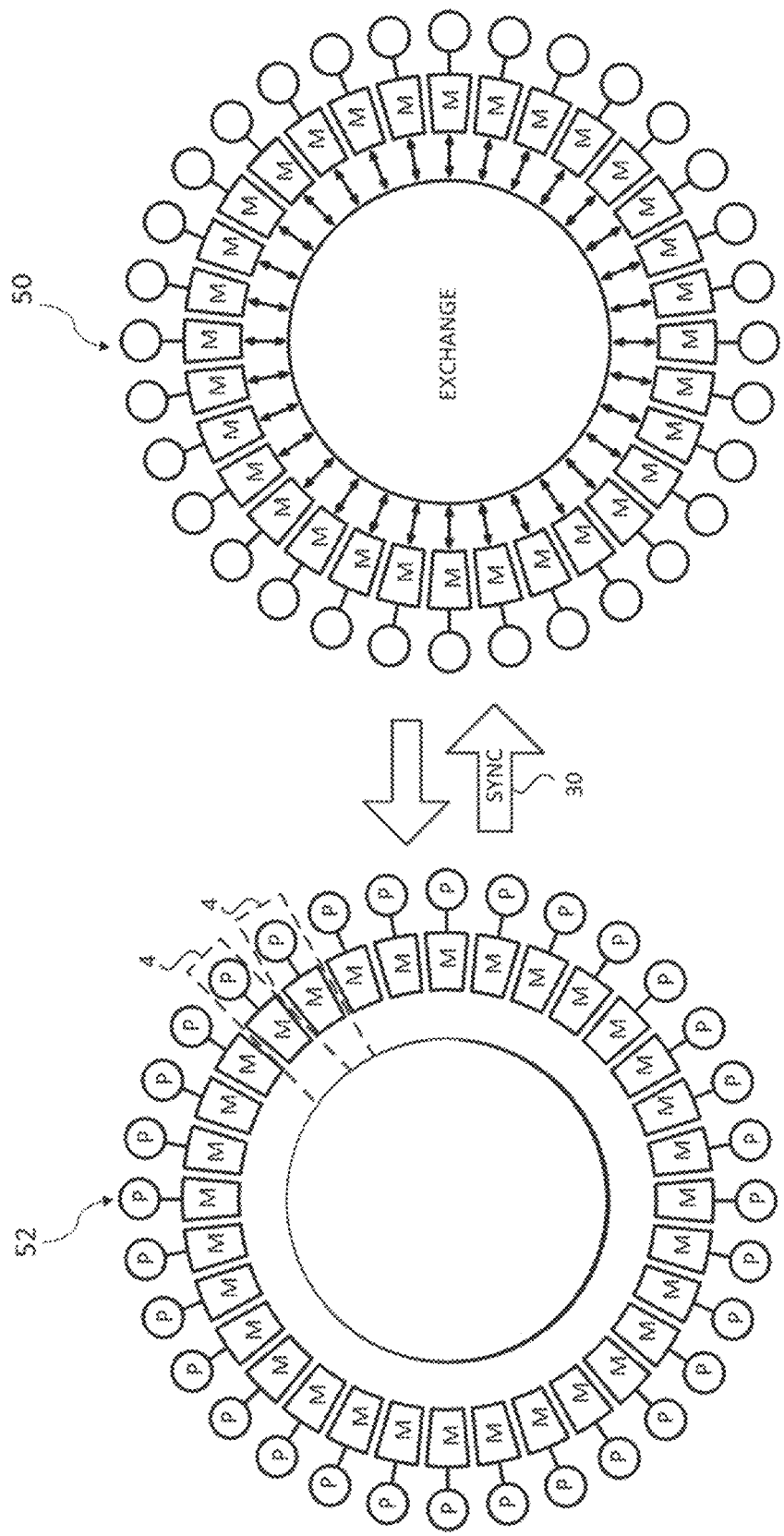
FIG. 3 is a diagram illustrating a BSP model.

As briefly mentioned above, data is exchanged between tiles 4 in the processing unit. Each processing unit 2 operates a Bulk Synchronous Parallel protocol, comprising a compute phase and an exchange phase. The protocol is illustrated for example in FIG. 3. The left-hand diagram in FIG. 3 represents a compute phase in which each tile 4 is in a phase where the stateful codelets execute on local memory (12, 22). Although in FIG. 3, the tiles 4 are shown arranged in a circle, this is for explanatory purposes only and does not reflect the actual architecture.

After the compute phase, there is a synchronisation denoted by arrow 30. To achieve this, a SYNC (synchronization) instruction is provided in the processor's instruction set. The SYNC instruction has the effect of causing the supervisor thread SV to wait until all currently executing workers W have exited by means of an EXIT instruction. In embodiments the SYNC instruction takes a mode as an operand (in embodiments its only operand), the mode specifying whether the SYNC is to act only locally in relation to only those worker threads running locally on the same processor module 4, e.g. same tile, or whether instead it is to apply across multiple tiles or even across multiple chips.

BSP in itself is known in the art. According to BSP, each tile 4 performs a compute phase 52 and an exchange (sometimes called communication or message-passing) phase 50 in an alternating cycle. The compute phase and exchange phase are performed by the tile executing instructions. During the compute phase 52 each tile 4 performs one or more computation tasks locally on-tile, but does not communicate any results of these computations with any others of the tiles 4. In the exchange phase 50, each tile 4 is allowed to exchange (communicate) one or more results of the computations from the preceding compute phase to and/or from one or more others of the tiles in the group, but does not yet perform any new computations that have a potential dependency on a task performed on another tile 4 or upon which a task on another tile 4 might potentially have a dependency (it is not excluded that other operations such as internal control-related operations may be performed in the exchange phase). Further, according to the BSP principle, a barrier synchronization is placed at the juncture transitioning from the compute phases 52 into the exchange phase 50, or the juncture transitioning from the exchange phases 50 into the compute phase 52, or both. That is it say, either: (a) all tiles 4 are required to complete their respective compute phases 52 before any in the group is allowed to proceed to the next exchange phase 50, or (b) all tiles 4 in the group are required to complete their respective exchange phases 50 before any tile in the group is allowed to proceed to the next compute phase 52, or (c) both of these conditions is enforced. This sequence of exchange and compute phases may then repeat over multiple repetitions. In BSP terminology, each repetition of exchange phase and compute phase is referred to herein as a "superstep", consistent with usage in some prior descriptions of BSP. It is noted herein that the term "superstep" is sometimes used in the art to denote each of the exchange phase and compute phase.

The execution unit (EXU) of the execution stage 18 is configured so as, in response to the opcode of the SYNC instruction, when qualified by an inter-tile operand, to cause the supervisor thread in which the "SYNC chip" was executed to be paused until all the tiles 4 in the array 6 have finished running workers. This can be used to implement a barrier to the next BSP superstep, i.e. after all tiles 4 on the processing unit 2 have passed the barrier, the cross-tile program as a whole can progress to the next exchange phase 50.

Each tile 4 indicates its synchronisation state to a sync module 36. Once it has been established that each tile 4 is ready to send data, the synchronisation process causes the system to enter an exchange phase which is shown on the right-hand side of FIG. 3. In this exchange phase, data values move between tiles (in fact between the memories of tiles in a memory-to-memory data movement). In the exchange phase, there are no computations which might induce concurrency hazards between tile programs. In the exchange phase, each datum moves along the connection wires on which it exits a tile 4 from a transmitting tile 4 to one or multiple recipient tile(s) 4.

In embodiments, at each clock cycle, datum moves a certain distance along its path (store to store), in a pipelined fashion. When a datum is issued from a tile 4, it is not issued with a header identifying a recipient tile (although the datum may include a header indicating at least one direction of travel through the switching fabric 34). Instead, the recipient tile 4 knows that it will be expecting a datum from a certain transmitting tile at a certain time. Thus, the computer described herein is time deterministic. Each tile 4 operates a program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile 4, where the time of execution of the SEND instruction is predetermined relative to the timing of other instructions being executed on other tiles 4 in the processing unit 2.

Each tile 4 can send and receive data from other tiles 4 of the processing unit 2 to which it belongs and can send and receive data from tiles 4 of the processing unit 2 of the other die. The mechanism by which interdie data exchange is achieved is described in more detail later, but first a discussion of how data is exchanged between tiles 4 on the same processing unit 2 is presented.

Each tile 4 is associated with its own multiplexer 210: thus, in embodiments, the processing unit 2 has 1216 such multiplexers 210. Each multiplexer 210 has 1216 inputs, each input being 32-bits wide (plus optionally some control bits). Each input is connected to a respective set of connecting wires $140_x$ in the switching fabric 34. The connecting wires $140_x$ of the switching fabric 34 are also connected to an output exchange bus 218 from each tile 4 and thus there are 1216 sets of connecting wires which, in this embodiment, extend in a direction across the processing unit 2. For ease of illustration, a single emboldened set of wires $140_{sc}$ is shown connected to the output exchange bus $218_s$, coming from a tile 4 not shown in FIG. 2, in the south array 6b.

As shown in FIG. 2, the data sent on the output exchange bus 218 of the tile 4 may be data sent by the tile 4 itself on its output wires 225. However, as will discussed in detail later, the data may also be received from a further tile 4 on another die.

This set of wires is labelled $140_x$ to indicate that it is one of a number of sets of crosswires $140_0$-$140_{1215}$. As can now be seen from FIG. 2, it will be appreciated that when the multiplexer 210 is switched to the input labelled $220_x$ then it will connect the tile 4 shown in FIG. 2 to the crosswires $140_x$, and thus to the output exchange bus $218_s$ of the tile (not shown in FIG. 2) from the south array 6b. If the multiplexer 210 is controlled to switch to that input ($220_x$) at a certain time, then the datum received on the data out wires $218_s$, which is connected to the set of connecting wire $140_x$ will appear at the output 230 of the multiplexer 210 at a certain time. It will arrive at the tile 4 a certain delay after that, the delay depending on the distance of the multiplexer 210 from the tile 4.

As the multiplexers 210 form part of switching fabric 34, the delay from the tile 4 to the multiplexer 210 can vary depending on the location of the tile. To implement the switching, the local programs executed on the tiles include switch control instructions (PUTi) which cause a multiplexer control signal 214 to be issued to control the multiplexer 210 associated with that tile 4 to switch its input at a certain time ahead of the time at which a particular datum is expected to be received at the tile 4. In the exchange phase, multiplexers 210 are switched and packets (data) are exchanged between tiles 4 using the switching fabric 34. The switching fabric has no state—the movement of each datum is predetermined by the particular set of wires to which the input of each multiplexer 210 is switched.

The SEND instruction comprises an indication of at least one direction in which a datum will travel along the switching fabric 34 from the transmitting tile 4 to one or more receiving tiles 4. Data transmitted from a single Tile T to single T may travel in one of two fixed directions along the exchange fabric 34, with the direction dependent on the identifiers of these two communicating tile instances. The tile architecture describes the exchange direction as observed by the sender and every send instruction uses a pair of configuration flags to indicate the direction of travel (East and/or West). It is functionally valid to set both the East-Valid and West-Valid flags for every executed SEND instruction (and indeed necessary when there are 2 or more recipient tiles and those recipients require a different transfer direction). However, in the cases where all recipient tiles are strictly to the East or West of the sending tile, setting only the relevant direction flag will enable the use of power optimisations.

Figure 4:
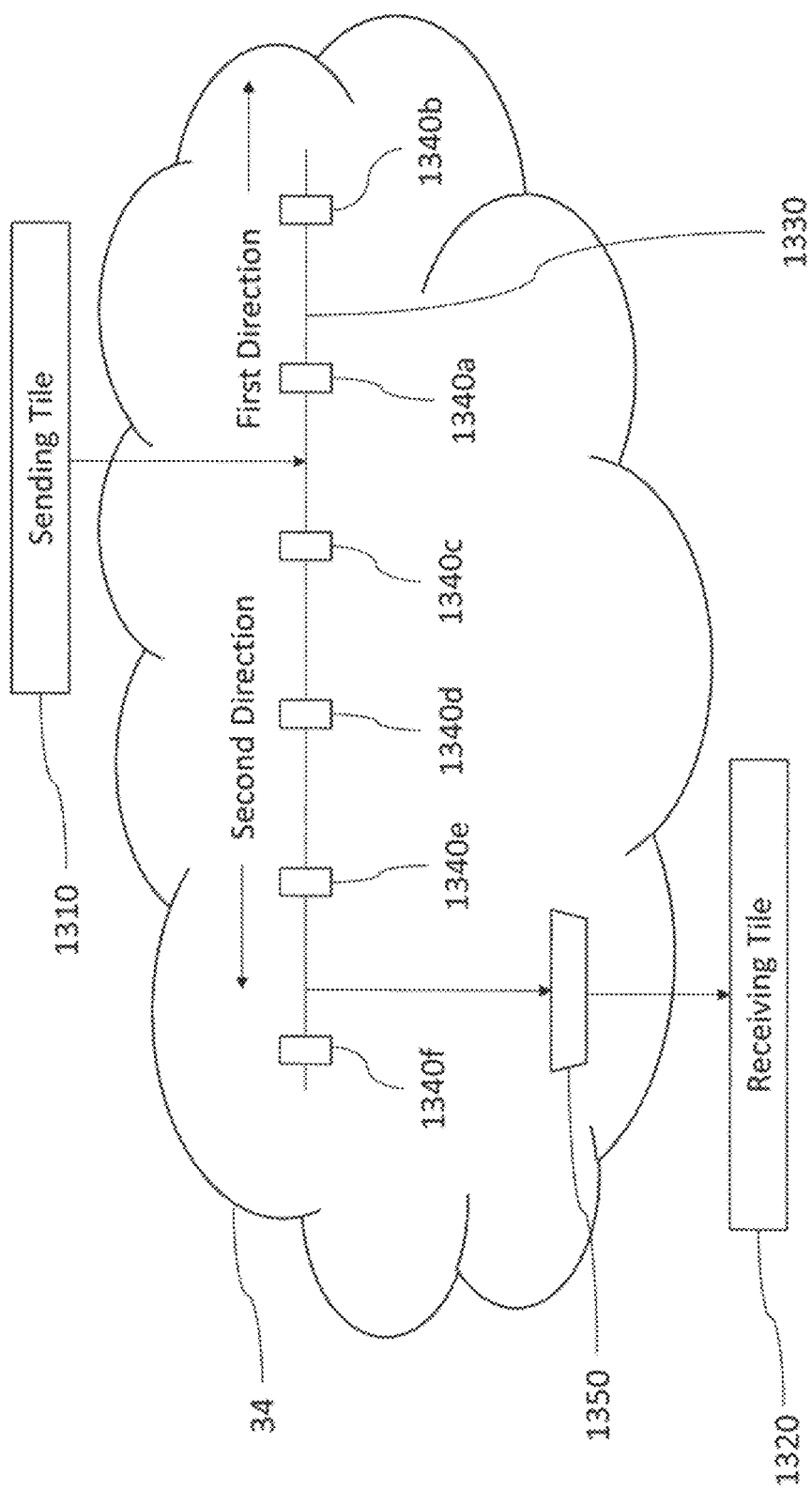
FIG. 4 is a schematic diagram showing two tiles exchanging data over a switching fabric.

Reference is made to FIG. 4, which illustrates how the indication of at least one direction may be used to control the direction of travel of a datum through the switching fabric 34.

When the processor of the sending tile 1310 executes a send instruction, an indication of the at least one direction provided by the send instruction may be inserted into a datum for transmission onto the switching fabric 34. The indication may be inserted in a header of the datum. In this example, the receiving tile 1320 is shown as being located in a second direction from the sending tile 1310. Therefore, the indication of the at least one direction comprises an indication that the datum is to be transmitted in the second direction through the switching fabric 34. Since, in this example, there is no receiving tile positioned in the first direction along the switching fabric 34 from the sending tile 1310, the indication of the at least one direction comprises an indication that the datum is not to be transmitted in the first direction through the switching fabric 34. The processor of the transmitting tile 1310 may be configured to, in response to the execution of the send instruction, transmit at a transmit time, the datum onto a connection wire 1330 of the switching fabric 34. On the connection wire 1330, are a series of temporary stores 1340a, 1340b, 1340c, 1340d, 1340e, 1340f, e.g. latches or flip flops which hold the datum for a clock cycle before releasing it to the next store. Each of the temporary stores may include or be associated with suitable processing circuitry to determine whether or not the datum should be transmitted on down the connection wire 1330 past the temporary store.

When the datum reaches one of the temporary stores, the indication of the at least one direction is evaluated to determine whether the datum is permitted to be transmitted through the temporary store or whether it should be blocked/prevented from being transmitted further along the switching fabric. For example, when the datum on the connection wire 1330 reaches the temporary store 1340a, the indication as to whether or not the datum is for transmission in the first direction is checked. Since, in this example, the datum is for transmission in the second direction only, for delivery to the receiving tile 1320, the datum is prevented from passing beyond the temporary store 1340a.

On the other hand, when the datum reaches the temporary store 1340c, the indication as to whether or not the datum is for transmission in the second direction is checked. In this case, since this indication is positive, the datum is transmitted through the temporary store 1340c along the connection wire 1330. The same check may be carried out and conclusion reached at the temporary stores 1340d, 1340e, and 1340f. This ensures that the datum will reach the receiving tile 1320 via the input multiplexer 1350 of that tile 1320.

Therefore, arrangement of the switching fabric 34 is configured to only pass datums along the one or more directions indicated for transmission in the datum and to prevent the transmission of the datum over the switching fabric 34 in directions not indicated for transmission in the datum. This has the advantage of enabling power optimisation by reducing the transmissions of datums to parts of the switching fabric 34 where there are no tiles that are destined to receive those particular datums. Directional opposites need not apply to the tile exchange directions. For example, if the tile 1310 is sending all of its data for delivery to the tile 1320 having indicators that transmission is allowed in the second direction, but not allowed in the first direction, this does not imply that, when the tile 1320 sends data for delivery to the tile 1310, that this data must include indicators that the transmission is allowed in the first direction, but not allowed in the second direction. It could, for example, be the case, that the tile 1320 transmits to the tile 1310 datums having indicators that transmission should take place in both the second direction and the first direction on the switching fabric.

One mechanism by which synchronisation between tiles 4 is achieved is the SYNC instruction mentioned above. Other mechanisms may be utilised: what is important is that all tiles can be synchronised between a compute phase of the processing unit and an exchange phase of the processing unit (FIG. 3). The SYNC instruction triggers the following functionality to be triggered in dedicated synchronization logic on the tile 4, and in the synchronization controller 36. The sync controller 36 may be implemented in the hardware interconnect 34 or, as shown, in a separate on chip module. This functionality of both the on-tile sync logic and the synchronization controller 36 is implemented in dedicated hardware circuitry such that, once the SYNC instruction is executed, the rest of the functionality proceeds without further instructions being executed to do so.

Firstly, the on-tile sync logic causes the instruction issue for the supervisor on the tile 4 in question to automatically pause (causes the fetch stage 14 and scheduler 24 to suspend issuing instructions of the supervisor). Once all the outstanding worker threads on the local tile 4 have performed an EXIT, then the sync logic automatically sends a synchronization request "sync_req" to the synchronization controller 36. The local tile 4 then continues to wait with the supervisor instruction issue paused. A similar process is also implemented on each of the other tiles 4 in the array 6 (each comprising its own instance of the sync logic). Thus at some point, once all the final workers in the current compute phase 52 have EXITed on all the tiles 4 in the array 6, the synchronization controller 36 will have received a respective synchronization request (sync_req) from all the tiles 4 in the array 6. Only then, in response to receiving the sync_req from every tile 4 in the array 6 of the same processing unit 2, the synchronization controller 36 sends a synchronization acknowledgement signal "sync_ack" back to the sync logic on each of the tiles 4. Up until this point, each of the tiles 4 has had its supervisor instruction issue paused waiting for the synchronization acknowledgment signal (sync_ack). Upon receiving the sync_ack signal, the sync logic in the tile 4 automatically unpauses the supervisor instruction issue for the respective supervisor thread on that tile 4. The supervisor is then free to proceed with exchanging data with other tiles 4 in via the interconnect 34 in a subsequent exchange phase 50.

Preferably the sycn_req and sync_ack signals are transmitted and received to and from the synchronization controller 36, respectively, via one or more dedicated sync wires connecting each tile 4 to the synchronization controller 36 in the interconnect 34.

Figure 5:
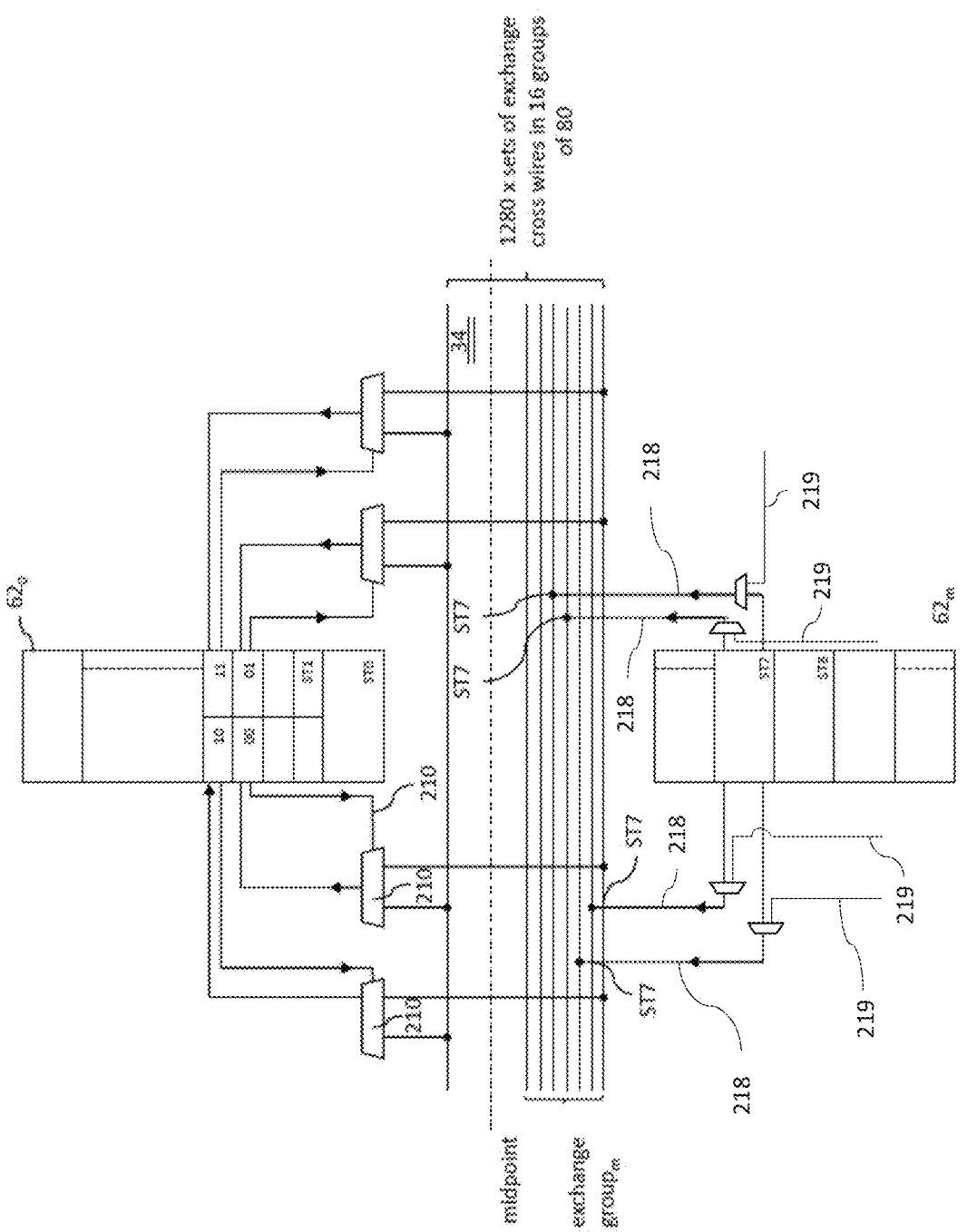
FIG. 5 is a schematic diagram shown the arrangement of tiles into columns of supertiles.

To better understand the layout of the tiles 4 of the processing unit 2, reference is made to FIG. 5, which illustrates an example of the layout of columns in the die to which the processing unit 2 belongs. Each tile 4 is part of a set of four tiles, referred to as a supertile 61. Each supertile 61 comprises four tiles 4. For simplicity, only a few of the supertiles 61 shown in FIG. 5 are shown divided into their constituent tiles.

Each supertile 61 is part of a subsystem of tiles 4 referred to as a column $62_n$. Therefore, each tile 4 is also part of a column $62_n$. In one embodiment, each column 62 comprises twenty supertiles 61, numbered $ST_0$ to $St_{19}$ (80 tiles in total). The columns $62n$ are arranged horizontally along the die in one dimension, with the switching fabric 34 being arranged horizontally along the die in another dimension.

As described above, each tile 4 has a 32 bit input connection 217, and 32 bit output exchange bus 218. As noted, the tile 4 knows (because it is defined in the sequence of instructions compiled for the tile) that it will be expecting a datum from a certain transmitting tile at a certain time, and executes a instruction, to control the multiplexer 210 to switch at a certain time to the input connected to the set of connecting wires 140 which is connected to the output exchange bus 218 of the sending tile 4. This ensures that the datum will appear at the output 230 of the multiplexer 210 at the time that the receiving tile 4 is expecting to receive it.

The multiplexer 210 receives a multiplexor control signal on the control line 214 which identifies a unique tile identifier indicating where that multiplexor should 'point'. That is, to which set of cross wires on the exchange 34 should that multiplexer connect in order to 'listen to' the tile 4 from which a transmission is expected at that time.

In the arrangement described herein, the multiplexer for the tiles 4 in each column 62 is connected to a bundle of 40 sets of the exchange cross wires. Each set permits a 32-bit datum to be conveyed over the exchange. As further shown in FIG. 5, the sets are divided into two, which are referred to as East and West (depending on which side of the column the multiplexers would be connected to). FIG. 5 shows two multiplexers connected to supertile ST2 on the east side of the column, and two multiplexers connected to supertile ST3 on the East side of the column. On the West side of the column two multiplexers are shown connected to two tiles in supertile ST2. For the sake of clarity, no other multiplexers or connection lines are shown in FIG. 5, but it will be appreciated that there are two multiplexers 210 for each supertile on each side of the column, making a total of twenty multiplexors 210 on the east side and twenty multiplexors 210 on the west side. Each multiplexor should be capable of connecting to any of the 1280 sets of exchange cross wires in the exchange fabric 34. In some processing units 2, only 1216 exchange cross wires are required, but in others all 1280 sets may be active.

As noted earlier, in addition to the exchange of data between tiles in the processing unit 2 that is implemented on a die, data exchange may also take place between tiles 4 on different die.

FIG. 2 shows the connection structure of the tile 4, which enables both intradie and interdie communication. In FIG. 2, each tile 4 has the following interfaces:

an exin interface 224, which passes data from the switching fabric 34 to the tile 4;

an exout interface 226, which passes data from the tile 4 to the switching fabric 34 of the processing unit 2 to which the tile 4 belongs;

an exmux interface 228 which passes the control mux signal 214 (mux-select) from the tile 4 to its input multiplexer 210;

a interdie data connection interface 221 for sending data to a tile 4 of a processing unit 2 on a different die over interdie data connection wires 219*a*; and a interdie control connection interface 222 for transmitting a signal over interdie control connection wires 223*a* to control a multiplexer of the tile 4 on the other die to which the data is sent over interdie data connection wires 219*a*.

Interdie data connection wires 219 are also shown in FIG. 5. Each of these connects a tile 4 on the other die to one of the output exchange buses 218 shown in FIG. 5. The interdie data connection wires 219 enable a tile 4 on the other die to send data via the exchange fabric 34 shown in FIG. 5. Each of the wires 219 is a vertical connection that is connected to a tile 4 on the other die that is positioned vertically above the tile 4 having the exchange bus 218 to which it connects. These two tiles 4 are said to be vertical neighbours.

Although in FIG. 2, the tile 4 has a separate interface 221 for providing data over the interdie connection wires 219*a*, in other embodiments, interdie connection wires 219*a* may be connected to the output wires 225, such that any data output on interface 226 is sent both to the multiplexer 227 associated with that tile 4 and to the multiplexer 227 associated with the neighbouring tile 4 on the other die. In this embodiment, which of the switching fabrics 34 over which the data is sent will depend upon the input selection of the two multiplexers 227.

Figure 6:
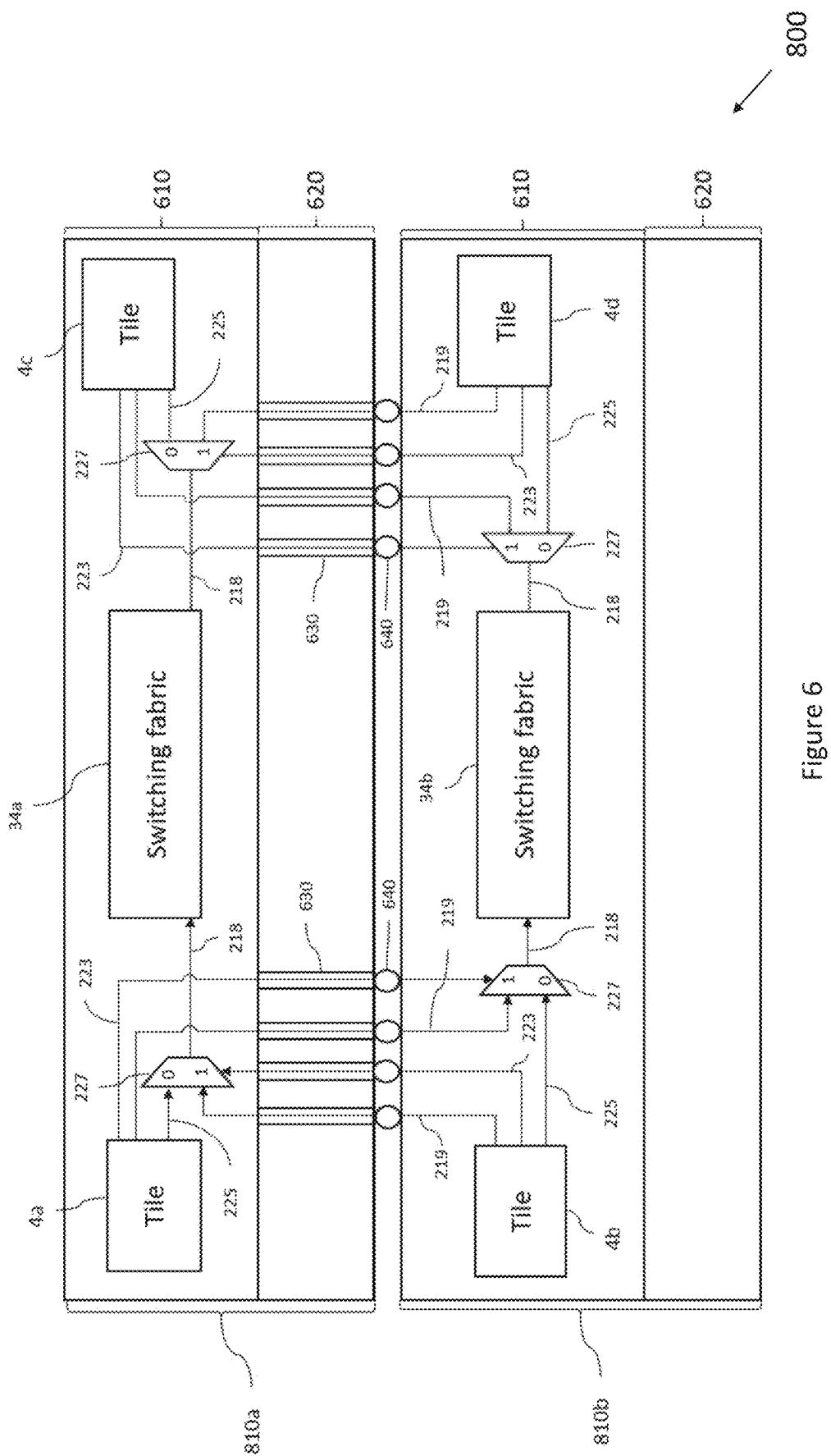
FIG. 6 is a schematic diagram illustrating an integrated circuit device comprising two stacked die.

Reference is made to FIG. 6, which illustrates an example of a stacked device 800 according to example embodiments. The stacked device 800 comprises a first die 810*a* and a second die 810*b*. Each of the die 810*a*, 810*b* comprises a metal layer portion 610 comprising the logic (including the processing unit 2 as discussed above) of the respective die. Additionally, each of the die 810*a*, 810*b* comprises a semiconductor substrate 620 on which the logic is constructed.

Each of the first die 810*a* and the second die 810*b* comprise identical versions of the processing unit 2 discussed above. In addition to the processing unit 2 discussed above, each of the die 810*a*, 810*b* comprises identical system on chip circuitry providing supporting functions to the processing unit 2. Although the two die 810*a*, 810*b* contain the same logic, they may differ in the thickness of their silicon substrate 620.

Although, for simplification, only a small number of example tiles 4 are shown in FIG. 6, each of the first die 810*a* and the second die 810*b* comprise all of the tiles 4 of the processing unit 2 as described above. Each of the tiles 4 in the first die 810*a* and second die 810*b* may operate in the same manner as the example tiles shown in FIG. 6. Both the first die 810*a* and the second die 810*b* comprise a switching fabric 34*a*, 34*b* as described above.

In the example shown in FIG. 6, the tile 4*a* corresponds to the tile 4*b*. In other words, the tile 4*a* and the tile 4*b* are vertical neighbours and occupy the same position in their respective die. Similarly, the tile 4*c* corresponds to the tile 4*d*. In other words, the tile 4*c* and the tile 4*d* are vertical neighbours and occupy the same position in their respective die. The tiles 4*a*, 4*c* each comprise a set of output wires 225 for sending data packets via an exchange bus 218 to the switching fabric 34*a* so as to send data packets to tiles 4 of their own die 810*a*. Likewise, the tiles 4*b*, 4*d* each comprise a set of output wires 225 for sending data packets via an exchange bus 218 to the switching fabric 34b so as to send data packets to tiles 4 of their own die 810b.

In addition to the wires for sending and receiving data packets from tiles 4 of their own die 810, each of the tiles 4 is associated with two sets of interdie data connection wires 219 for sending and receiving data packets with their corresponding tile 4 on the other of the two die 810a, 810b. For example, the tile 4a has an interdie data connection bus 219 enabling it to send data packets via the output exchange bus 218 of the tile 4b. The tile 4a is able to send data packets along this output exchange bus 218 to the switching fabric 34b to send data to a tile 4 on die 810b. Similarly, the tile 4b has an interdie data connection bus 219 enabling it to send data packets via the output exchange bus 218 of the tile 4a. The tile 4b is able to send data packets along this output exchange bus 218 to the switching fabric 34a to send data to a tile 4 on die 810a. The same interdie data connection wires 219 are present between tile 4c and tile 4d.

A multiplexer 227 is provided for each of the tiles 4 in both die. Each such multiplexer 227 has as its output, the exchange output bus 218 of its associated tile 4. In dependence upon a control signal supplied to the multiplexer 227, the multiplexer 227 may supply either a data packet output from its associated tile 4 or data output by its associated tile's corresponding tile 4 on the other of the two die 810a, 810b. The control signal that controls each multiplexer 227 is supplied by this corresponding tile 4. For example, suppose that tile 4a has data to send to a tile 4 on die 810b. The tile 4a asserts a signal on wire 223 to control the multiplexer 227 associated with tile 4b so as to select the input connected to the interdie connection wire 219 of tile 4a. At the same time, tile 4a sends the data packet via its set of wires 219 to the selected input of the multiplexer 227. When the data packet arrives at the multiplexer 227, the data is output onto the output exchange bus 218 associated with the tile 4b and thereby delivered over the switching fabric 34b to one or more of the tiles 4 on die 810b.

In the case that, at a particular time, instead of tile 4a having data to send over the switching fabric 34b, the tile 4b has data to send over the switching fabric 34b, it is arranged that the tile 4a does not assert the control signal to the multiplexer 227 to select the input on wires 219. The tile 4b may then send a data packet on its set of output wires 225 to the other input of the multiplexer 227 to be sent via the output exchange bus 218 to be delivered over switching fabric 34b to a tile 4 on the die 810b. Since the code running on each of the tiles 4 in both die 810a, 810b is generated together at compile time, it may be arranged that tile 4a will not assert the control signal on wire 223 when tile 4b has data to send via its associated exchange bus 218.

It would be appreciated that, although it is described herein that a tile 4 asserts a signal on wire 223 to control the multiplexer 227 to output an input received on interdie connection wire 219, it could equally be the case that the tile 4 asserts a signal to control the multiplexer 227 to output an input received on output wires 225 instead and deasserts the signal to select the other input.

Part of the interdie data connections 219 and the control signal lines 223 are implemented in connections through the metal layers 610 of the die 810a, 810b. Additionally, part of the interdie data connections 219 and the select signal lines 223 are implemented in connections through the substrate 620 in the die 810a. The connections through the substrate 620 take the form of backside through silicon vias 630. At the interface between the two die 810a, 810b, each of the through silicon vias 630 connects to metal contacts on the top of the die 810b via bonding contacts 640, which form part of the connections for transferring the associated signals. Although, for simplification, FIG. 6 shows only a single through silicon via 630 for transferring the interdie connections 219 since, in embodiments, each interdie connection bus 219 comprises a group of wires for transferring the bits of a data packet in parallel, a group of through silicon vias 630 may be used for each interdie data connection 219.

Referring back to FIG. 2, the two sets of interdie data wires 219a, 219b for allowing the tile 4 and its corresponding tile 4 to send interdie data are shown. Additionally, the two control signal wires 223a, 223b for allowing the tile 4 and its corresponding tile 4 to control each other's multiplexer 227 are shown. The tile 4 shown in FIG. 2 may be any of the tiles 4a, 4b, 4c, 4d shown in FIG. 6.

When sending a data packet to a tile 4 on the other die, the tile 4 sends the data packet to the output exchange bus 218 of the corresponding tile 4 via connection 219a. As already described in detail, the tile 4 may also send a data packet via output wires 225 to send data via its own exchange bus 218 to a tile 4 on its own die. The selection of which of the switching fabrics 34a,b over which data is sent is made by the processor logic of the tile 4. More specifically, the selection of which of the switching fabrics 34a,b over which to send a data packet may be dependent upon an operand of the send instruction as specified in the complied code held in the memory of the tile 4.

In some embodiments, the tile 4 may be operable to multicast data to more than one tile 4, with different ones of the tiles 4 to which data is being multicast belonging to different die. In this case, the tile 4 may send a data packet via connection 219a to one or more tiles 4 on the other die and may send the same data packet via exchange bus 218 to one or more tiles 4 on its own die. Such a multicast operation could be performed by the operand of the send instruction causing the tile 4 to send copies of the data packet via both of the interfaces 221, 226 (if separate interfaces are provided) or by transmitting a single data packet on wires 225 (if the interdie connection wires 219a are connected to the wires 225).

Referring back to FIG. 6, it is noted that pairs of corresponding tiles 4a, 4b may be prevented from sending data packets at the same time to tiles 4 on the same die 810a, 810b, so as to avoid conflict on the relevant output exchange bus 218 and in the relevant switching fabric 34. For example, if the tile 4a were to execute a send instruction to send a data packet via its output exchange bus 218 and the tile 4b were to execute a send instruction to send a data packet via the output exchange bus 218 of tile 4a. If the timing of the execution of the send instructions is such that data collision between these two data packets were to occur on the exchange bus 218 of tile 4a, then the execution of these send instructions is not permitted. As will be described in more detail, the exchange scheduling performed by the compiler, which determines when each of the send instructions by the tiles 4 of both die 810a, 810b, are executed is performed so as to prevent such conflict in the sending of the data from pairs of corresponding tiles 4.

Therefore, pairs of corresponding tiles 4 are programmed so as not to execute send instructions to send data over the same output exchange bus 218 at the same time. This presents a constraint on the sending of data to tiles 4 on the same die by pairs of corresponding tiles 4. However, pairs of tiles 4 may each still send data via the output exchange bus 218 of their associated tile 4 at the same time. For example, tile 4a may output a data packet via wires 219 to be transmitted via output exchange bus 218 associated with tile 4b. Tile 4b may, at the same time, send data via wires 219 to be transmitted via output exchange bus 218 associated with tile 4a. To achieve this, tile 4a executes a send instruction to send a data packet via its interdie connection 219 to the exchange bus 218 of tile 4b so as to send data via switching fabric 34b to a tile 4 on die 810b. In the same clock cycle, tile 4b may also execute a send instruction to send a data packet via its interdie connection 219 to the exchange bus 218 of tile 4a so as to send data via switching fabric 34a to a tile 4 on die 810a. Thus, each of tiles 4a, 4b may transmit to the tiles 4 on their opposing die at the same time.

In order to make efficient use of the wiring available for exchanging data packets between the tiles 4 in the stacked device 800, the exchange of data may be divided into two distinct exchange periods.

There may be an intradie exchange period, during which tiles 4 in the device 800 send data to other tiles 4 on their own die, without sending data to tiles 4 on the other die. Additionally, there may be an interdie exchange period, during which tiles 4 in the device 800 send data to tiles 4 on the other die of the device 800, without sending data to tiles 4 on their own die.

Figure 9:
FIG. 9 illustrates a sequence of compute and exchange phases in which the stacked integrated circuit device may participate.

Reference is made to FIG. 9, which illustrates how the different exchange periods may fit into the BSP model described. As shown, the device 800 may operate in a compute phase 910 during which the tiles 4 perform their computations on data to generate results. Following this, the device 800 may operate in an exchange phase 920, during which the tiles 4 exchange their data with one another. The exchange phase 920 is divided into an intradie exchange period and an interdie exchange period as described. Following this exchange phase 920, the device 800 may move through further compute phases 930, 950 and an exchange phase 940 as shown.

When sending data between tiles 4 (either on the same die or on different die), in order to ensure that each individual tile 4 executes send instructions and switch control instructions at appropriate times to transmit and receive the correct data, exchange scheduling requirements need to be met by the programmer or compiler that allocates individual programs to the individual tiles in the computer. The scheduling function is carried out by an exchange scheduler which needs to be aware of the certain exchange timing (BNET) parameters. In order to understand the parameters, reference is made to FIG. 7, which illustrates how a tile $4_{T1}$ may send data to a tile $4_R$ (where both tile $4_{T1}$ and tile $4_R$ are part of a first die) and how a $4_{T2}$ may send data to tile $4_R$ (where tile $4_{T2}$ belongs to a second die).

Figure 7:
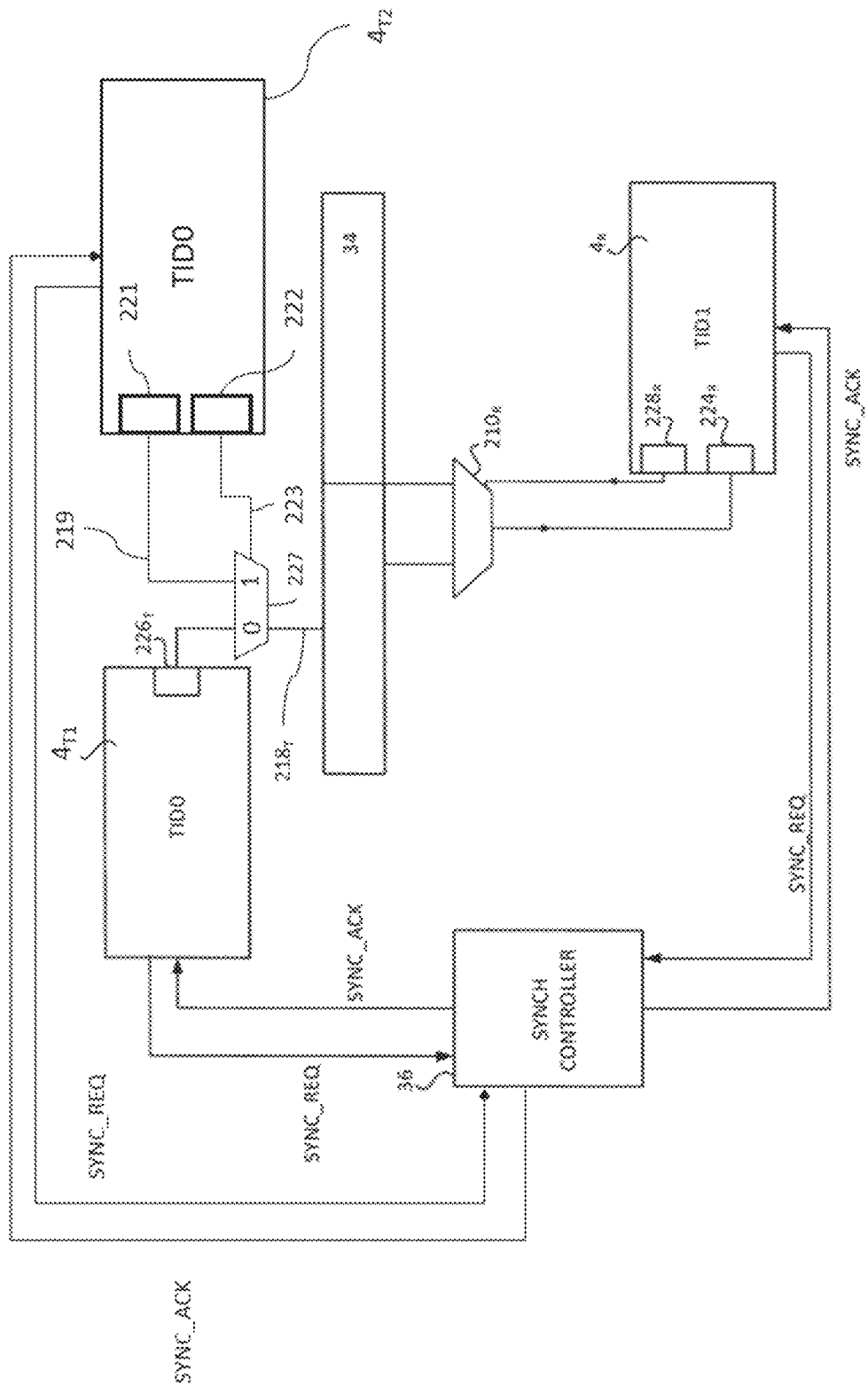
FIG. 7 illustrates the different paths via which signals and data are exchanged in order to achieve time deterministic exchange.

A synch controller 36 is shown in FIG. 7. This synch controller 36 belongs to the same die as the tiles $4_{T1}$ and $4_R$. As noted earlier, the synch controller 36 receives and acknowledges sync requests received from tiles 4 of its associated processing unit 2 when those tiles 4 reach a sync barrier. In the case that a sync takes place between tiles on different die, there are two synch controllers 36 that could be involved in the sync, one on each die. In this case, one of the synch controllers 36 serves as a master synch controller 36, which receives sync requests from tiles 4 on the other die as well as from tiles 4 on its own die. For example, FIG. 7 shows the tile $4_{T2}$ sending a sync request to synch controller 36. These sync requests sent from the other die to the synch controller 36 may be sent directly from each of the tiles 4 on the other die via dedicated interdie sync wires between those tiles 4 and the synch controller 36. In this case, the sync controller 36 transmits the sync acknowledgments to each of the tiles 4 on the other die over the dedicated interdie sync wiring. In this example, the synch controller 36 on the other die (not shown in FIG. 7) may be disabled.

First, the scheduling requirements for sending data between tiles (e.g. between tile $4_{T1}$ and tile $4_R$) on the same die are described. The differences in the scheduling requirements when data is sent between tiles (e.g. between tile $4_{T2}$ and tile $4_R$) on different die is then described.

From the point at which the synch controller 36 issues sync acknowledgments to the tiles 4 of the processing unit 2 to initiate the exchange phase, the following delays must be taken into consideration when sending data between tiles 4 of the same processing unit 2:

I. The relative SYNC acknowledgement delay.
 II. The exchange mux control loop delay.
 III. The tile-to-tile exchange delay, BNET_TT.
 IV. The exchange traffic memory pointer update delay, BNET_MMP( ).

Each of these delays for intradie exchange will now be discussed in detail.

I. The relative SYNC acknowledgement delay of each tile, BNET_RSAK (TID). TID is the tile identifier held in a TILE_ID register described later. This is a number of cycles always greater than or equal to 0 indicating when each tile 4 receives the ack signal from the sync controller 36 relative to the earliest receiving tile 4. This can be calculated from the tile ID, noting that the tile ID indicates the particular location in the processing unit 2 of that tile 4, and therefore reflects the physical distances. Although shown only schematically and not to scale, the tile $4_{T1}$ is indicated closer to the sync controller 36 and the tile $4_R$ is indicated being further away, with the consequence that the sync acknowledgement delay will be shorter to the tile $4_{T1}$ than for the tile $4_R$. A particular value will be associated with each tile 4 in the processing unit 2 for the sync acknowledgement delay. These values can be held for example in a delay table, or can be calculated on the fly each time based on the tile ID.

II. The exchange mux control loop delay, BNET_MXP (TID of receiving tile). This is the number of cycles between issuing an instruction (PUTi-MUXptr) that changes a tile's input mux selection and the earliest point at which the same tile could issue a (hypothetical) load instruction for exchange data stored in memory as a result of the new mux selection. Looking at FIG. 7, this delay comprises the delay of the control signal getting from the exmux interface $228_R$ of recipient tile $4_R$ to its multiplexer $210_R$ and the length of the line from the output of the multiplexer to the data input exin interface 224.

III. The tile-to-tile exchange delay, BNET_TT (TID of sending tile, TID of receiving tile). This is the number of cycles between a send instruction being issued on one tile and the earliest point at which the receiving tile could issue a (hypothetical) load instruction pointing to the sent value in its own memory. This has been determined from the tile IDs of the sending and receiving tiles, either by accessing a table such as has already been discussed, or by calculation. Looking again at FIG. 7, this delay comprises the time taken for data to travel from transmit tile $4_{T1}$ from its ex_out interface $226_T$ to the switching fabric 34 along its output wires 225 and exchange bus $218_T$ and then via the input mux $210_R$ at the receiving tile $4_R$ to the ex_in interface $224_R$ of the receiving tile $4_R$.

IV. The exchange traffic memory pointer update delay, BNET_MMP( ). This is the number of cycles between issuing an instruction (PUTi-MEMptr) that changes a tile's exchange input traffic memory pointer and the earliest point at which that same tile could issue a (hypothetical) load instruction for exchange data stored in memory as a result of the new pointer. This is a small, fixed number of cycles. The memory pointer has not be previously discussed, but is shown in FIG. 2 referenced 232. It acts as a pointer into the data memory 202 and indicates where incoming data from the ex_in interface 224 is to be stored.

When data is sent from a tile $4_{T2}$ to a receiving tile $4_R$, the same delays from the point at which the master synch controller 36 issues sync acknowledgments to initiate the exchange phase also apply. There are, however, differences in the way that the "I. The relative SYNC acknowledgement delay" and the "III. The tile-to-tile exchange delay, BNET_TT" are calculated.

Regarding the relative sync acknowledgment, the additional time required to propagate the sync acknowledgment from the master synch controller 36 to the other die is also taken into consideration by the exchange scheduler.

Regarding the tile-to-tile exchange delay, the component of the time taken for a data packet to reach the switching fabric 34 along the output wires 225 and exchange bus $218_T$ of a tile 4 is replaced with the time taken for data to travel from transmit tile $4_{T2}$ from its interface 221 to the switching fabric 34 along its interdie data connection wires 219 and exchange bus 218. In other words, the time of travel along output wires 225 to the tile's multiplexer 227 on the same die is replaced with the time of travel along interdie data connections wires 219 to the multiplexer 227 of the neighbouring tile 4 on the other die.

The exchange scheduling is performed by the compiler 70, which compiles the code to run on each of the tiles 4. Local programs 72 (a local program 72 is compiled for each tile 4) are compiled so as to execute each of the send and switch control instructions at the appropriate clock cycles in accordance with the determined timing parameters so as to implement the time deterministic exchange both between tiles 4 on the same die and between tiles 4 on different die.

Figure 8:
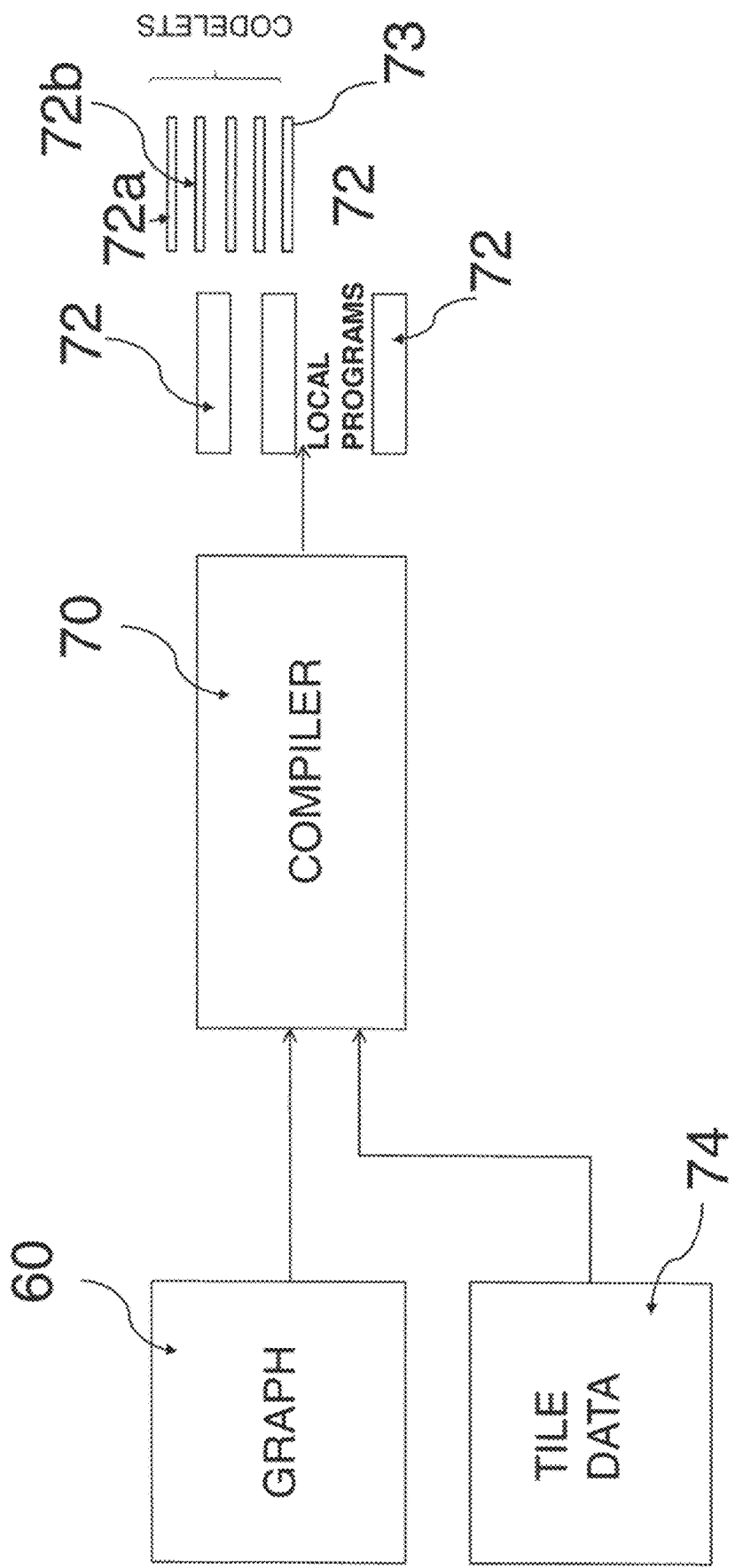
FIG. 8 is a schematic architecture illustrating operation of a compiler for generating time deterministic programs.

FIG. 8 is a schematic diagram illustrating the function of a compiler 70. The compiler 70 produces code to run on all of the tiles 4 of a computer, the "computer" including the stacked device 800 described. The compiler 70 receives such a graph 60 and compiles the functions in the graph 60 into a multiplicity of codelets, which are contained into local programs labelled 72 in FIG. 7. Each local program 72 is designed to be loaded into a particular tile 4 of the computer. Each program comprises one or more codelets forming worker threads 72a, 72b . . . plus a supervisor sub-program 73 each formed of a sequence of instructions. The compiler generates the programs such that they are linked to each other in time, which is they are time deterministic. In order to do this the compiler accesses tile data 74 which includes the tile identifiers described earlier which are indicative of the location of the tiles and therefore the delays which the compiler needs to understand in order to generate the local programs. The delays have already been mentioned above, and can be computed based on the tile data 74. Alternatively, the tile data 74 can incorporate a data structure in which these delays are available through a lookup table. The supervisor program comprises exchange code which manages the exchange of data in the exchange phase.

When sending data packets over the exchange wiring as described, it is advantageous to reduce skew in the clock cycle between adjacent pipeline stages along the wires. The distribution of the clock signal to reduce skew when exchanging data between tiles 4 on different die is now described.

Figure 10:
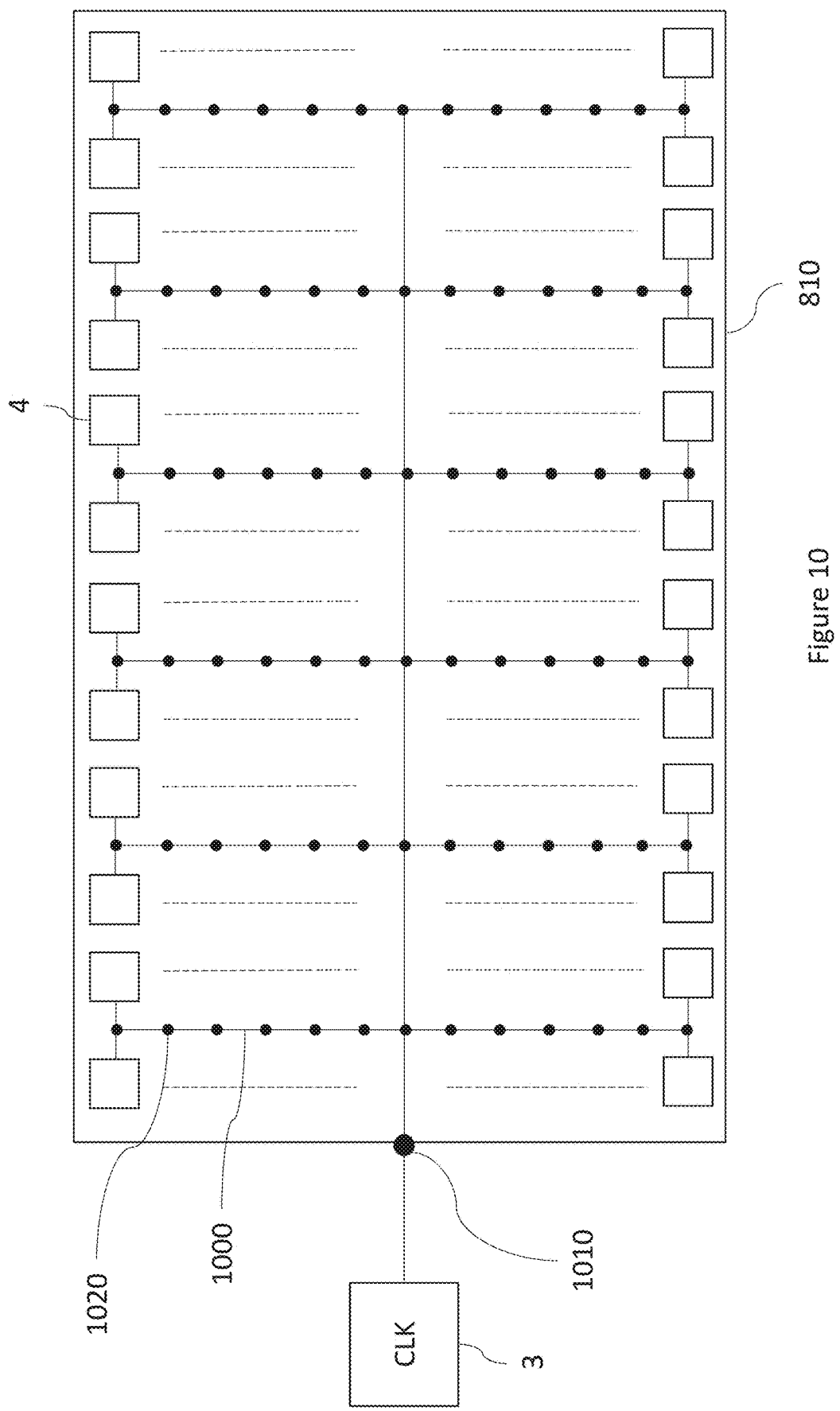
FIG. 10 illustrates the distribution of a clock signal in a single die.

Reference is made to FIG. 10, which illustrates how a clock signal is distributed across the exchange of a single die 810. A clock 3 is shown in the Figure. The clock 3 produces a clock signal, which is provided to the die 810 at an insertion point 1010 on the die 810. At the insertion point 1010, the clock signal is provided via metal contacts on the top portion of the die 810 to the logic of the die 810.

FIG. 10 shows the distribution of the clock signal across the exchange. The clock signal is distributed along the wiring 1000 across the switching fabric 34 and up and down the columns of tiles 4. Each of the points 1020, in FIG. 10 represents a buffer stage 1020 for the clock signal. At each buffer stage 1020, the clock signal is received, rebuffered and transmitted over a further part of the clock distribution wiring 1000.

The clock signal is used to time the transfer of data between pipeline stages along the switching fabric 34 and along the wires, e.g. the output exchange bus 218 and input wires. Clock signalling for the individual pipeline stages along the exchange wiring is derived from the clock signal sent along the wires 1000. Since the clock signal is distributed along a path that is parallel to the path via which data is exchanged, clock skew between adjacent pipeline stages in the exchange is minimised.

Figure 11:
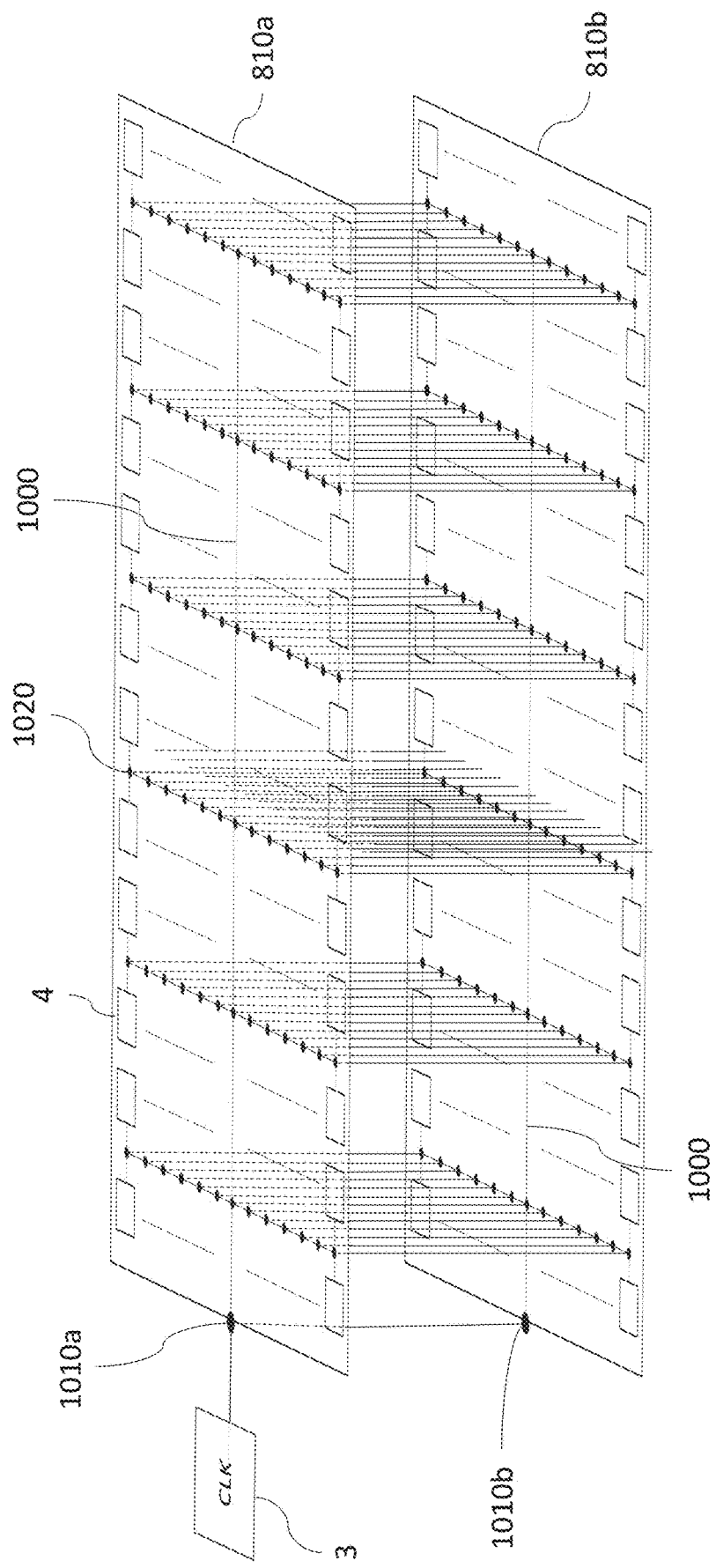
FIG. 11 illustrates the distribution of clock signal in a multi-die stacked device.

Reference is made to FIG. 11, which illustrates how the clock signal is distributed in the stacked device 800.

As shown, the clock signal is inserted to the device at an insertion point 101a of the die 810a. This insertion point 101a may be the same as insertion point 101 discussed above with respect to FIG. 10. The clock signal is provided through the through silicon vias in the substrate of the die 810a to the die 810b at a further insertion point 101b. This insertion point 101b connects the clock distribution wiring 1000 of die 810b to the clock distribution wiring 1000 of die 810a. The clock signal is propagated in each die 810a, 810a along wires 1000 and buffer stages 1020 as described above with respect to FIG. 10.

As the clock signals are propagated along the clock distribution wires 1000 of the device 800, there is the possibility that the clock signals at neighbouring points in the two die may become out of phase with one another. As described earlier, in the stacked device 800, the data is transmitted from one die 810a to the other die 810b via the interdie connections 219. If there exist substantial phase differences in the clock signal between corresponding points in the die 810a, 810b, skew between the adjacent pipeline stages along the interdie connections 219 may result. This skew may be referred to as interdie skew.

As shown in FIG. 11, in order to minimise the skew between adjacent pipeline stages between the two die 810a, 810b, there are a plurality of connections 1110 between the clock distribution wires 1000 of the two die 810a, 810b. These connections 1110 are formed using through silicon vias in the substrate of the die 810a. The presence of the plurality of the connections 1110 keeps the clock signal closely aligned in phase at each of the neighbouring pipeline stages across the two die 810a, 810b. The clock distribution wiring 1000 in the two die may be said to be "stitched together".

In some embodiments, and as shown in FIG. 11, there may be one such connection wire 1110 at each buffer stage 1020 of the clock distribution wiring 1000. This minimises the interdie skew.

In some embodiments, corresponding components on separate die may be provided with separate connections provided for outputting data, one of these connections for outputting data above the die and the other of these connections for outputting data below the die. Additionally, corresponding components on each die may be provided with separate connections for receiving data, one of these connections for receiving data from above the die and the other of these connections for receiving data from below the die. In dependence upon the position of the respective die, different ones of the connections may be unconnected for sending/receiving data. For example, the wires connecting to the top metal layer of the die at top of the stack will not be connected for sending or receiving data (since there is no further die above). Similarly, the wires connecting to the bottom metal layer of the die at the bottom of the stack will not be connected for sending or receiving data (since there is no further die below). Different wiring is used, in dependence upon the position of the die in the stack. In this way, each die may be provided with the same design, and be used in different positions in the stack.

In the following description, reference is made to a top surface of a die. This refers to the top surface of the top metal layer of the respective die. The top surface of the die is formed on the surface of the top metal layer of the die. The metal layers of the die also include a bottom metal layer, which is on the opposite side of the metal layers to the top metal layer and is formed on the substrate. Reference is also made to a bottom surface of a die. This refers to the bottom surface of the substrate of the respective die. The vertical dimension of the die is considered to extend between the top surface and the bottom surface of that die.

Figure 17A:
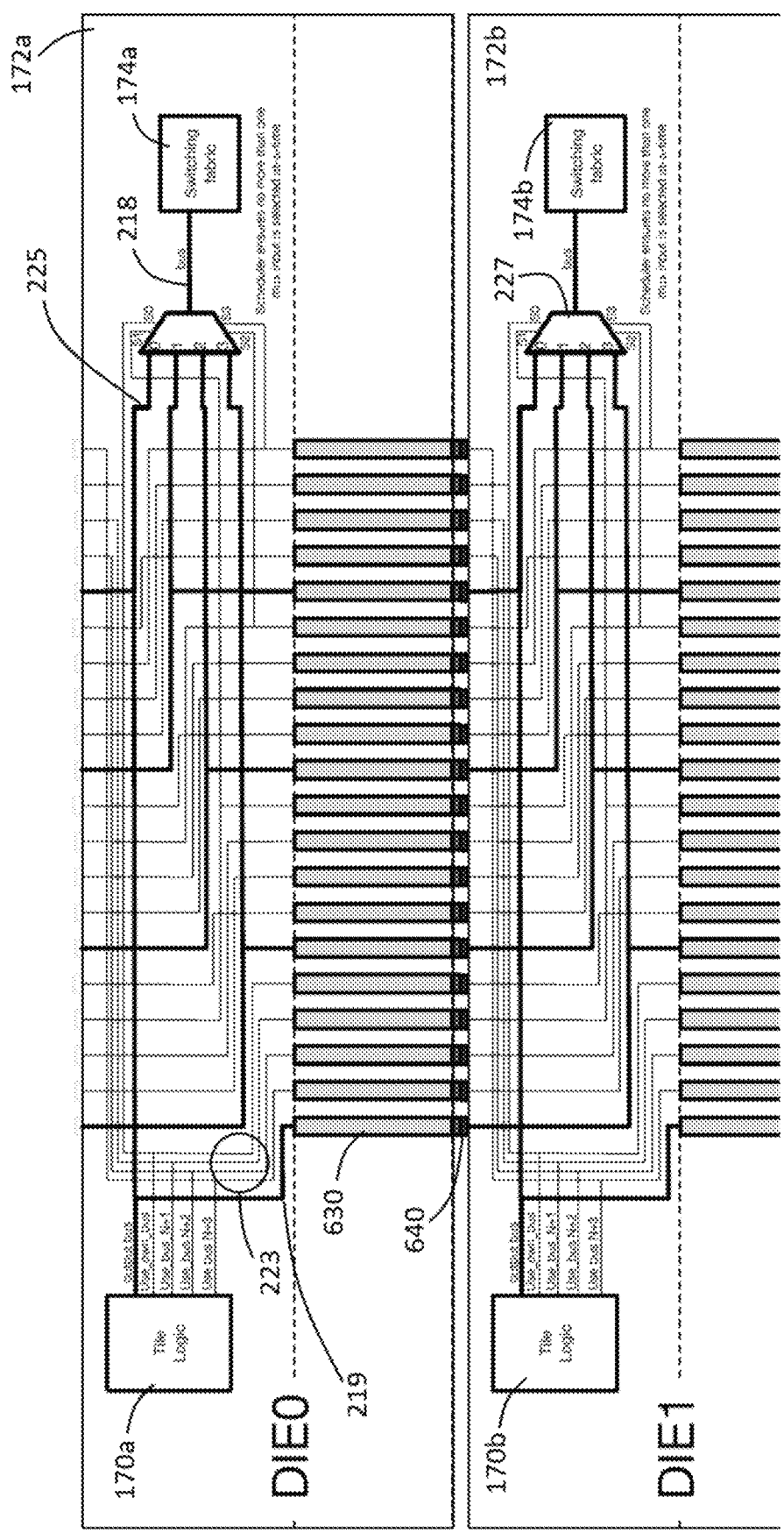
FIG. 17A illustrates the top half of a stacked die structure comprising four stacked die.
Figure 17B:
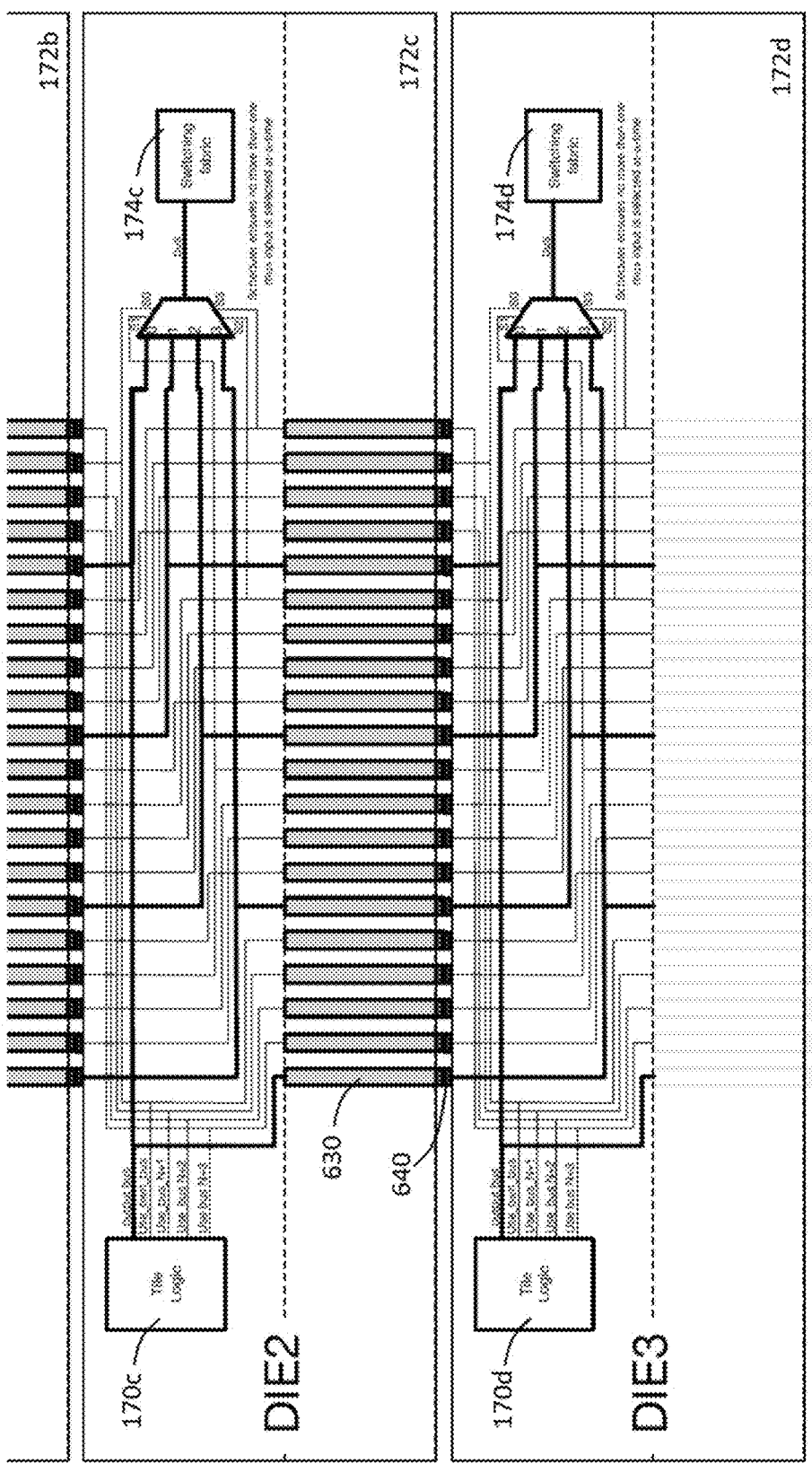
FIG. 17B illustrates the bottom half of a stacked die structure comprising four stacked die.

In the stacked IC devices described, there are two or more die that have a set of connection wires for exchanging data between one another. In FIGS. 12A, 12B, 13, and 14, these two or more die are die 810a, 810b. In FIG. 15, these two or more die are die 151a, 151b, and 151c. In FIGS. 17A and 17B, these two or more die are die 172a, 172b, 172c, and 172d. There may be additional die, e.g. die 404, in the stacked devices that do not include a set of connection wires as in the two or more die.

Reference is also made to a top die and a bottom die in the stacked structure. The top die is the one of the two or more die in the stacked device that has the top of its metal layers facing away from the others of the two or more die. In FIGS. 12A, 12B, 13, and 14, the top die is die 810a. In FIG. 15, the top die is die 151a. In FIG. 17A, the top die is 172a. The bottom die is the one of the two or more die in the stacked device for which the bottom surface of its substrate faces away from the two or more die in the stacked device. In FIGS. 12A, 12B, 13, and 14, the bottom die is die 810b. In FIG. 15, the bottom die is die 151c. In FIG. 17B, the bottom die is 172d.

Figure 12A:
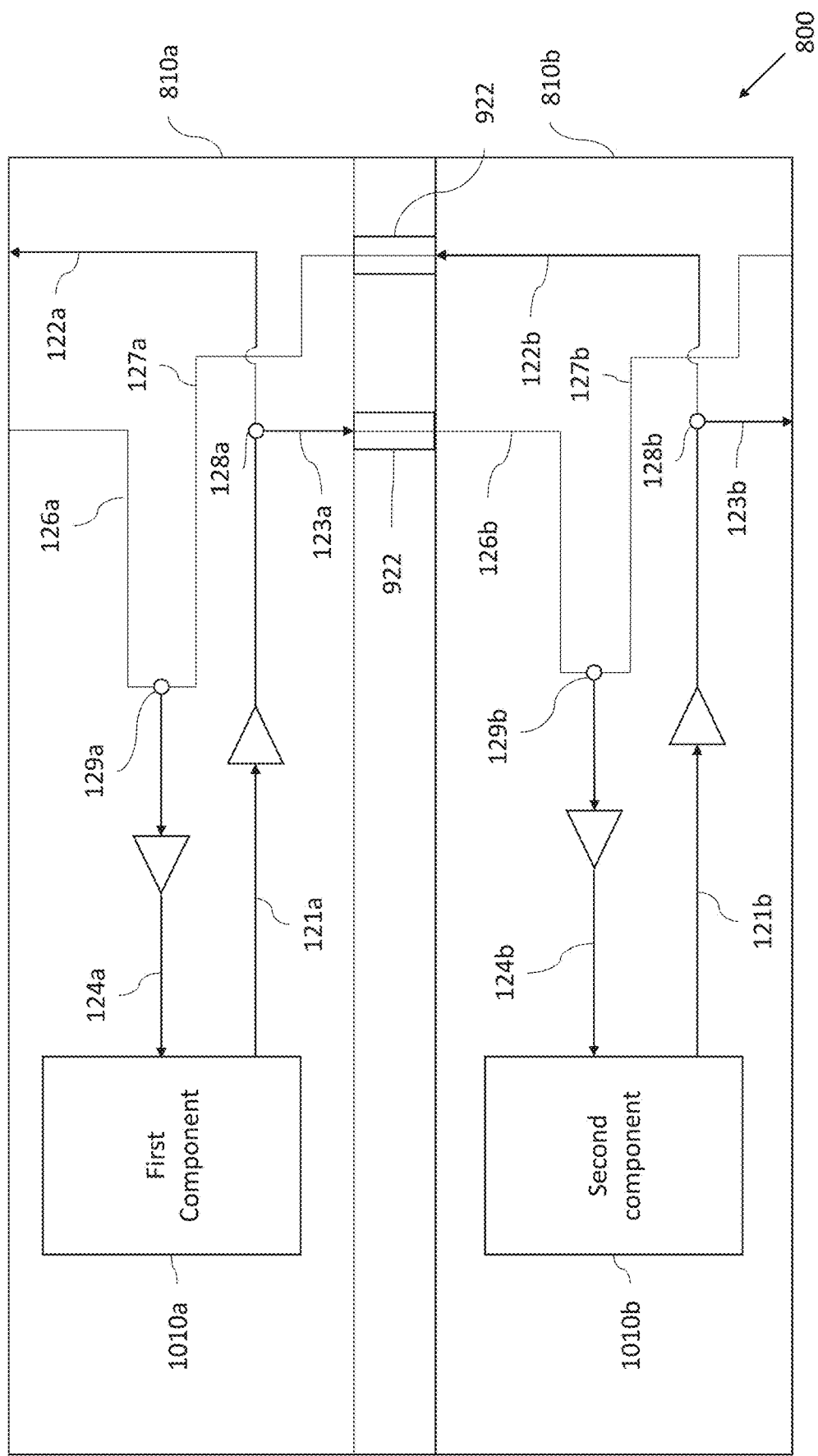
FIG. 12A illustrates a stacked integrated circuit device comprising two die, each having two input and two output paths.

Reference is made to FIG. 12A, which illustrates an example as to how a first component 1010a on the first die 810a may communicate with a second component 1010b on the second die 810b. Each of the first components 1010a, 1010b comprises processing circuitry for sending and receiving data as described. In embodiments, each of the components 1010a, 1010b is a tile 4 of a multi-tile processing unit 2. In the structure 800 of FIGS. 12A and 12B, the first die 810a is stacked on top of the second die 810b, such that the substrate of the first die 810a is bonded to the top surface of the metal layers of the second die 810b. The device 800 may be the same as that described with respect to FIG. 6.

The first component 1010a is operable to output data via bus 121a. The bus 121a comprises a group of wires for transmitting a data packet from the first component 1010a. This bus 121a divides into two separate output paths 122a, 123a at the connection points 128a. Each of the two separate output paths 122a, 123a also comprises a same number of wires as the bus 121a. In embodiments, the bus 121a comprises 32 wires for transmitting a 32-bit data packet in parallel, with each of the output paths 122a, 123a also comprising 32 wires. Each of the Connection points 128a may be a point at which each wire of the output paths 122a, 123a is bonded to its corresponding wire of the output bus 121a. By virtue of being connected together, the outputs paths 122a, 123a form a single piece of copper. As a result of the division of bus 121a into two different paths 122a, 123a, any data output by the first component 121a on its bus, will be sent along both of the paths 122a, 123a.

Output path 122a connects to the top of the die 810a, whilst output path 123a connects to the bottom metal layer of the die 810a. Since the die 810a is the top of the two die 810a, 810b, output path 122a is unconnected to a further die or logical component and terminates at the top surface of die 810a, whilst output path 123a connects to die 810b via TSVs 922. In this way, the output path 122a terminates at the top metal layer of die 810a and is not used for sending data above die 810a. On the other hand, output path 123a is enabled for sending data to die 810b.

The first component 1010a is operable to receive data via an input bus 124a, which is connected via connection points 129a to two input paths 126a, 127a. Each of the two separate input paths 126a, 127a also comprises a same number of wires as the bus 124a. In embodiments, the bus 124a comprises 32 wires for transmitting a 32-bit data packet in parallel, with each of the input paths 126a, 127a also comprising 32 wires. Each of the connection points 129a may be a point at which corresponding wires of the two input paths 126a, 127a are bonded together to form a single set of wires 124a. Input path 126a connects to the top of the die 810a, whilst input path 127a connects to the bottom metal layer of the die 810a. Since the die 810a is the top of the two die 810a, 810b, input path 126a is unconnected to a further die or logical component and terminates at the top surface of die 810a, whilst input path 127a connects to die 810b and is used for receiving data from that die 810b. In this way, the input from the input path 126a at the top surface of die 810a is floating and is not used for receiving data from above die 810a. On the other hand, input path 127a is enabled for receiving data from die 810b.

The second die 810b comprises an equivalent component 1010b and equivalent wiring to the first die 810a. Specifically, the second component 1010b is operable to output data via bus 121b. The bus 121b comprises a group of wires for transmitting a data packet from the second component 1010b. This bus 121b divides into two separate output paths 122b, 123b at connection point 128b (which is identical to connection point 128a). Output path 122b connects to the top of the die 810b, whilst output path 123b connects to the bottom metal layer of the die 810b. Since the die 810b is the bottom one of the two die 810a, 810b, output path 123b is unconnected to a further die or logical component and terminates at the bottom metal layer of die 810b, whilst output path 122b connects to die 810a via TSVs 922. In this way, the end of output path 123b at the bottom metal layer of die 810b and is not used for sending data below die 810b. On the other hand, output path 122b is enabled for sending data from die 810b to die 810a.

The first component 1010b is operable to receive data via an input bus 124b, which divides at connection points 129b into two input paths 126b, 127b. Input path 126b connects to the top of the die 810b, whilst input path 127b connects to the bottom of the die 810b. Since the die 810b is the bottom of the two die 810a, 810b, input path 127b is unconnected to a further die or logical component and terminates at the bottom metal layer of die 810b, whilst input path 126b connects to die 810a via TSVs 922 and is used for receiving data from that die 810a. In this way, the input from input path 127b is floating, such that input path 127b is not used for receiving data from below die 810b. On the other hand, input path 126b is enabled for receiving data from die 810a.

In the arrangement in FIG. 12A, each of the components 1010a, 1010b receives the data that is output by the other of the components 1010a, 1010b. When component 1010a sends data, this data is sent along output path 123a and input path 126b, such that the data is received at component 1010b. When component 1010b sends data, this data is sent along output path 122b and input path 127a, such that the data is received at component 1010a.

The wiring (i.e. buses 121a, 124a, 126a, 127a, 123a, 122a) on die 810a is identical to the wiring (i.e. buses 121b, 124b, 126b, 127b, 123b, 122b) on die 810b. Therefore, different wiring arrangements for the top die 810a and the bottom die 810b are not required. The components 1010a, 1010b may also be identical.

In some embodiments, the connections 129a, 129b are replaced with multiplexers 125a, 125b. Each of these multiplexers is configured to select between the input paths or output paths in dependence upon a die identifier signal. By providing for selection between the inputs in this way, the design and verification process for the device 800 is simplified. In particular, the description of the device in a hardware description language (HDL) is simplified, since it is not required to describe the buses 124a, 124b as being fed by two different inputs.

Figure 12B:
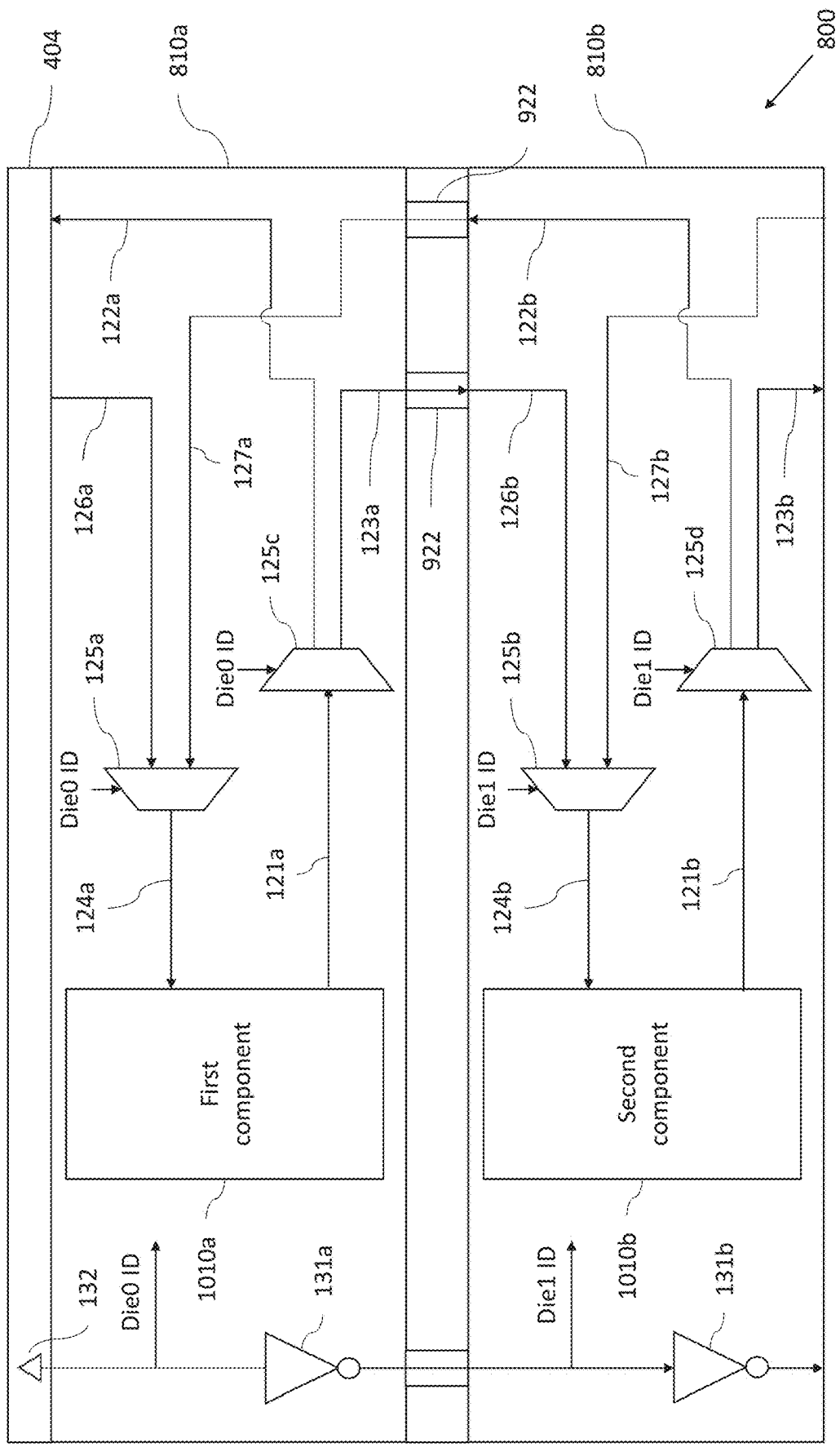
FIG. 12B illustrates an embodiment of the stacked integrated circuit device comprising two die, in which multiplexing between the input and output paths is performed.

Reference is made to FIG. 12B, which illustrates an example as to how a first component 1010a on the first die 810a may communicate with a second component 1010b on the second die 810b in the case that multiplexing between the input paths is performed. In this example, multiplexing between output paths based on a die ID signal is also performed. Multiplexing between outputs paths is optional, but may be performed to reduce the power consumption that would be associated with transmitting data on two output paths. The components shown in FIG. 12B are the same as the components in FIG. 12A that have the same reference numerals.

The first component 1010a is operable to output data via bus 121a, as in the example of FIG. 12A. The data is received at the multiplexer 125c. Responsive to the die ID signal for die 810a, the output path 123a of multiplexer 125c is selected such that the data is output along path 123a.

The first component 1010a is operable to receive data via input bus 124a as in the example of FIG. 12A. In this case, the input bus 124a is connected via multiplexer 125a to the two input paths 126a, 127a. In response to the die ID signal for die 810a, the input path 127a is selected so as to enable receipt of data from die 810b.

The second die 810b comprises an equivalent component 1010b, equivalent multiplexer 125b and equivalent wiring to the first die 810a. The second component 1010b is operable to output data via bus 121b. Responsive to the die ID signal for die 810b, the output path 122b of multiplexer 125d is selected such that the data is output along path 122b.

The second component 1010b is operable to receive data via input bus 124b as in the example of FIG. 12A. In this case, the input bus 124b is connected via multiplexer 125b to the two input paths 126b, 127b. In response to the die ID signal for die 810b, the input path 126b is selected so as to enable receipt of data from die 810a.

Since the multiplexers 125a, 125b are controlled by different die ID signals to select different inputs (i.e. input path 127a for multiplexer 125a and input path 126b for multiplexer 125b), each of the components 1010a, 1010b receives the data that is output by the other of the components 1010a, 1010b. When component 1010a sends data, this data is sent along output path 123a and input path 126b, where it arrives at the selected input of the multiplexer 125b such that the data is received at component 1010b. When component 1010b sends data, this data is sent along output path 122b and input path 127a, where it arrives at the selected input of the multiplexer 125a such that the data is received at component 1010a.

Additionally, since the multiplexers 125c, 125d are controlled by different die ID signals to select different outputs (i.e. output path 123a for multiplexer 125c and output path 122b for multiplexer 125d), each of the components 1010a, 1010b receives the data that is output by the other of the components 1010a, 1010b. When component 1010a sends data, this data is sent along bus 121a where it arrives at the multiplexer 125c and is output on the selected output such that the data is sent along path 123a to be received at component 1010b. When component 1010b sends data, this data is sent along bus 121b where it arrives at the multiplexer 125d and is output on the selected output such that the data is sent along path 122b to be received at component 1010a.

The wiring (i.e. buses 121a, 124a, 126a, 127a, 123a, 122a) on die 810a is identical to the wiring (i.e. buses 121b, 124b, 126b, 127b, 123b, 122b) on die 810b. Therefore, different wiring arrangements for the top die 810a and the bottom die 810b is not required. The components 1010a, 1010b may also be identical.

In some embodiments, the die ID signal used to control the multiplexers 125a-d is generated from a single signal, which is inverted in each die 810a, 810b. FIG. 12B illustrates an example in which the die ID signal is generated using inversion between the die. A connection to ground 132 is provided in an additional die 404, which is stacked on top of the die 810a. The connection to ground 132 holds the signal at ground. This signal level is a signal level that is interpretated as a zero (or low signal). The signal at this level is provided to the die 810a and forms the die ID signal for die 810a. This die ID signal is provided to multiplexer 125a, where it causes the input path 127a to be selected for providing data to the first component 1010a. The die ID signal is provided to multiplexer 125c, where it causes the output path 123a to be selected for providing data to the second component 1010b.

The die ID signal for die 810a is inverted by invertor 131a to provide the die ID signal for die 810b. This signal level is a signal level that is interpreted as a one (or high signal). The signal at this level is provided to the multiplexer 125b, where it causes the input path 126b to be selected for providing data to the second component 1010b. This die ID signal for die 810b is provided to multiplexer 125d, where it causes the output path 122b to be selected for providing data to the first component 1010a.

Therefore, an invertor 131a may be applied to provide different one bit die IDs for the two different die 810a, 810b, so as to ensure that different input paths are selected and each component 1010a, 1010b receives its data from the other of the components 1010a, 1010b.

A second invertor 131b is shown in die 810b. Since there are only two die 810a, 810b in this example, the signal output by this invertor 131b is not needed and terminates at the bottom metal layer of die 810b.

In the examples described, the input paths 126a,b may be labelled as first input paths, the output paths 122a,b may be labelled as first output paths, the input paths 127a,b may be labelled as second input paths, and the output paths 123a,b may be labelled as second output paths. The second output path 123a connects and provides data to the first input path 126b via the TSVs 922. The first output path 122b connects and provides data to the second input path 127a via the TSVs 922.

In embodiments, the data that is output by each component 1010a, 1010b may not be delivered directly to the other component, but may be sent over a switching fabric. Such data delivered over the switching fabric may be sent to other destinations, instead of to the other one of the components 1010a, 1010b.

Figure 13:
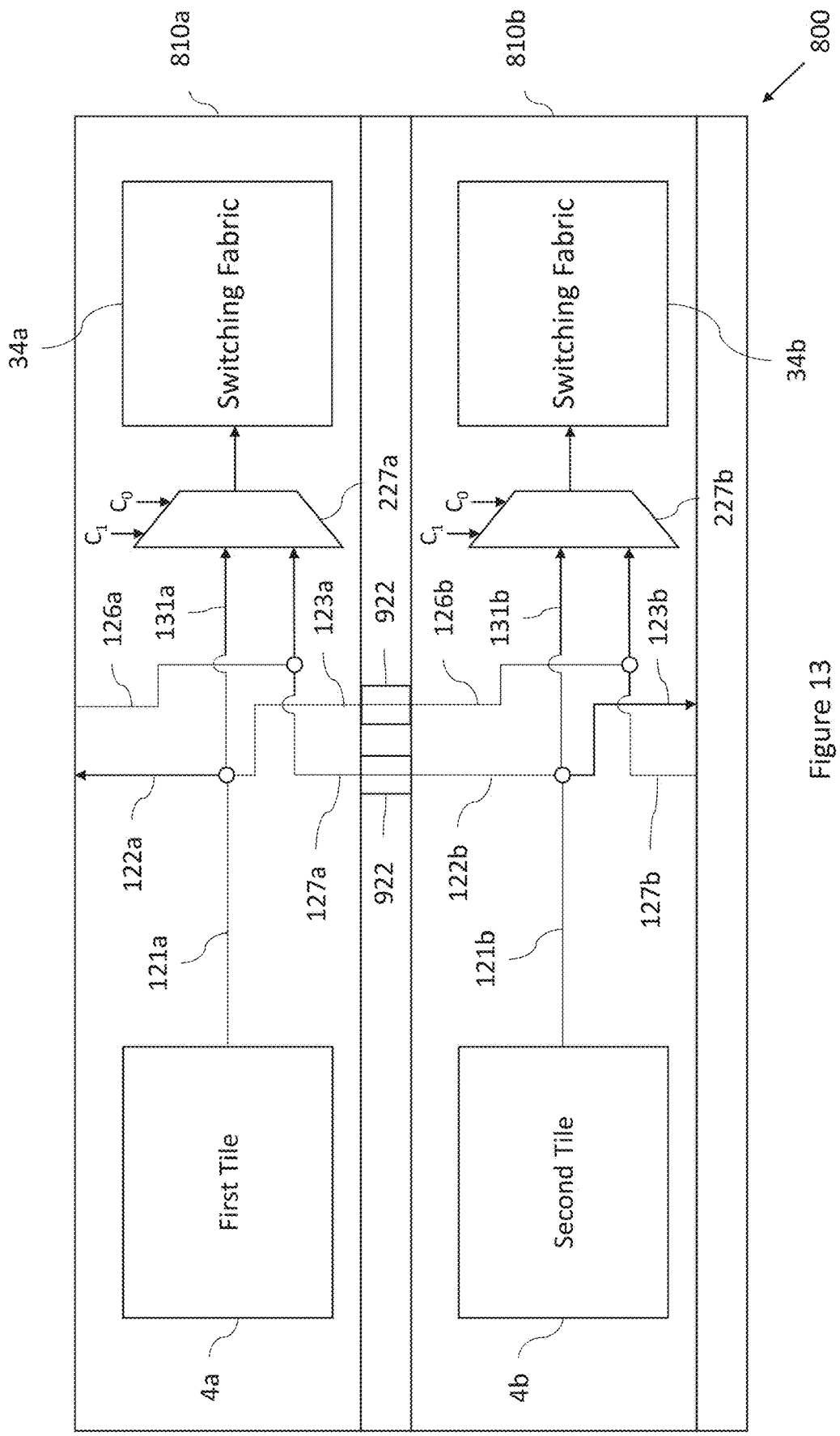
FIG. 13 illustrates an embodiment of the stacked integrated circuit device comprising two die, in which the components output data onto switching fabrics.

Reference is made to FIG. 13, which illustrates an example in which the components 1010a, 1010b take the form of tiles 4. The first component 1010a takes the form of a tile 4a, whilst the second component 1010b takes the form of tile 4b. Each of the tiles 4a is operable to send data over a switching fabric 34a, 34b. The switching fabric 34a, 34b may be the same as the switching fabrics 34a, 34b discussed above with reference to FIG. 6.

The tile 4a outputs data via output bus 121a. The output bus 121a divides into three different paths 122a, 131a, 123a. A first output path 122a, as in the examples of FIGS. 12A and 12B, connects to the top of the die 810a and is unconnected for outputting data. A second output path 123a, as in examples of FIGS. 12A and 12B, connects to the bottom metal layer of die 810a and may be used for outputting data to the die 810b. A third output path 131a is used for outputting data over switching fabric 34a to a tile 4 on the same die 810a.

Similarly, the tile 4b outputs data via output bus 121b. The output bus 121b divides into three different paths 122b, 131b, 123b. A first output path 122b, as in the examples of FIGS. 12A and 12B, connects to the top of the die 810b and may be used for outputting data to the die 810a. A second output path 123b, as in examples of FIGS. 12A and 12B, connects to the bottom metal layer of die 810b and is unconnected for outputting data. A third output path 131b is used for outputting data over switching fabric 34b to a tile 4 on the same die 810b.

When data is output by either of tiles 4a, 4b, which of the three output paths for that tile 4 on which data will be sent depends upon which of the inputs of multiplexer 227a, 227b is selected. The multiplexers 227a, 227b are controlled to select a particular input in dependence upon control signals received from the tiles 4a, 4b. Each multiplexer 227a, 227b may receive a first control signal ($C_0$) from its own associated tile 4a, 4b, where that first control signal causes it to select the input for receiving data from its own tile 4a, 4b via one of input paths 131a, 131b. Each multiplexer 227a, 227b may also receive a second control signal ($C_1$) from the neighbouring tile 4b, 4a of its associated tile 4a, 4b, where that second control signal causes it to select the other input for receiving data (via path 126a, 126b) from that neighbouring tile 4b, 4a.

Suppose that tile 4b has data to send to a tile 4 on die 810a. The tile 4b asserts its control signal $C_1$, which causes the multiplexer 227a to select the input for receiving data from die 810b. The tile 4b then outputs its data on bus 121b. This data traverses path 127a and passes through multiplexer 227a to be sent over switching fabric 34a to the destination tile 4 on die 810a. Since the tile 4b has not asserted control signal $C_0$, the multiplexer 227b does not output data received on path 131b from tile 4b. It is arranged via the compilation of the code for running on each tile 4 that, when tile 4b asserts its $C_1$ signal to send to tile 4 on die 810a, then tile 4a will not assert its $C_0$ signal to send to a tile 4 on its own die 810a.

In order to send data to a tile 4 on die 810b, tile 4a performs the same operations as performed by tile 4b when tile 4b sends data to a tile 4 on die 810a. In other words, the tile 4a asserts its $C_1$ signal and sends data on its bus 121a.

In order to send data to a tile 4 on its own die 810a, tile 4a asserts its control signal $C_0$, which causes the multiplexer 227a to select the input for receiving data from its associated tile 4a. The tile 4a then outputs its data on bus 121a. This data traverses path 131a and passes through multiplexer 227a to be sent over switching fabric 34a to the destination tile 4 on die 810a. Since the tile 4a has not asserted control signal $C_1$, the multiplexer 227b does not output data received on path 126b from tile 4a. It is arranged via the compilation of the code for running on each tile 4 that, when tile 4a asserts its $C_0$ signal to send to a tile 4 on its own die 810a, then tile 4b will not assert its $C_1$ signal to send to a tile 4 on that die 810a.

In order to send data to a tile 4 on die 810b, tile 4b performs the same operations as performed by tile 4a when tile 4a sends data to a tile 4 on die 810a. In other words, the tile 4b asserts its $C_0$ signal and sends data on bus 121b, which is provided over which fabric 34b.

Figure 14:
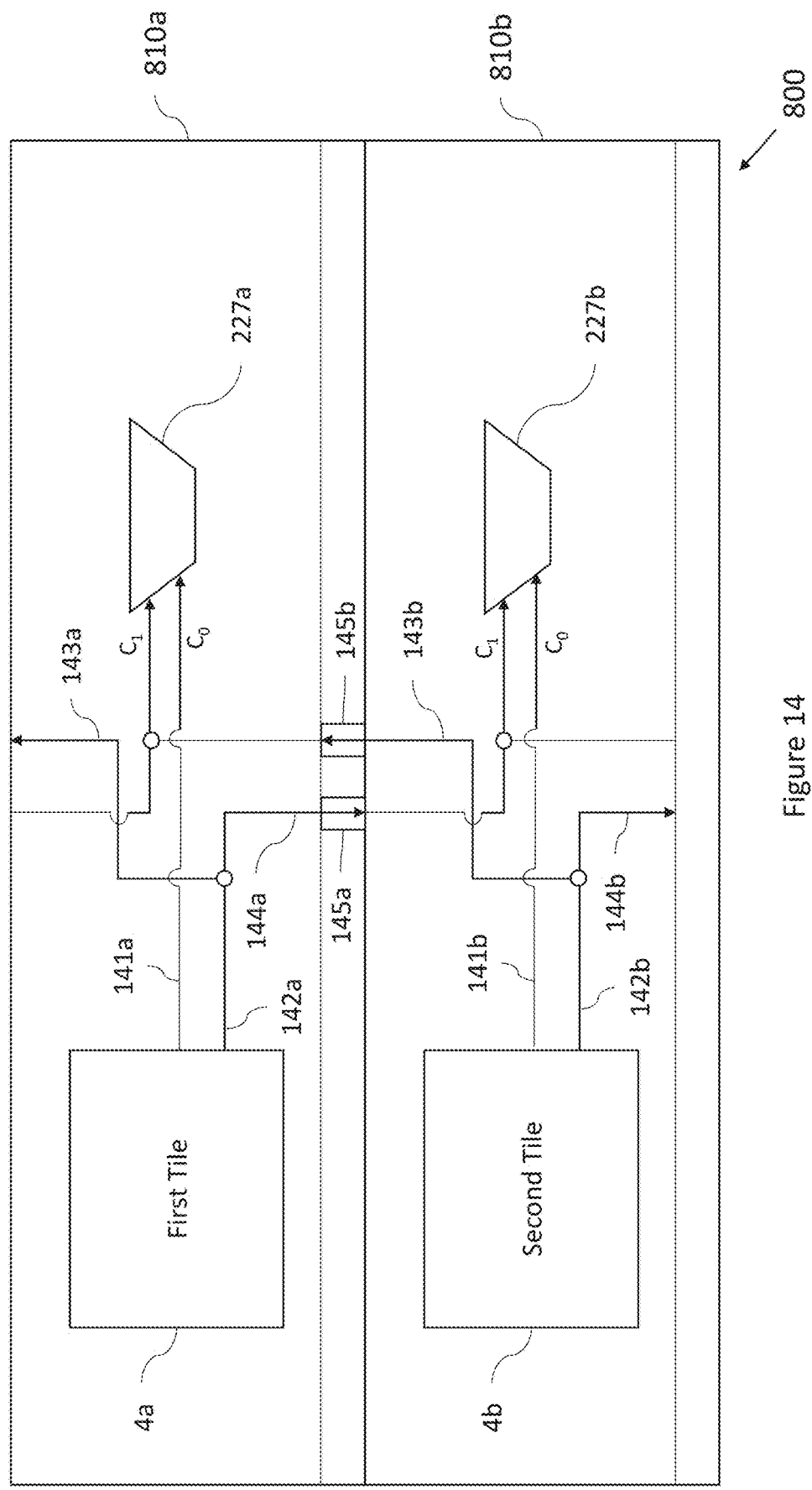
FIG. 14 illustrates how the components of the stacked integrated circuit device control multiplexers for outputting data onto the switching fabrics.
Figure 15:
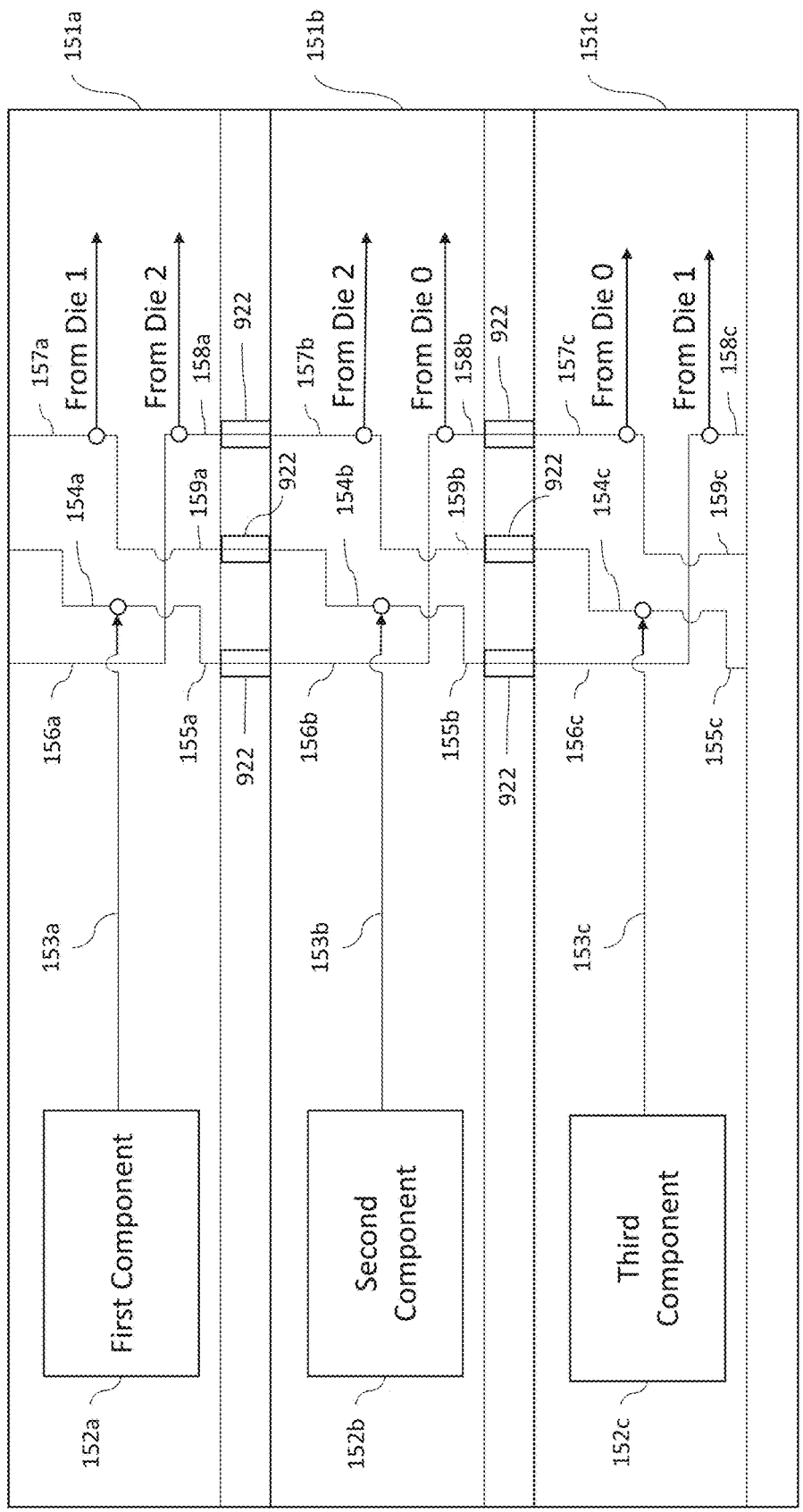
FIG. 15 illustrates a stacked integrated circuit device comprising three die, each having two output paths and four input paths.

Reference is made to FIG. 14, which illustrates how the control signals may be provided by each tile 4a, 4b for controlling multiplexers 227a, 227b. Each tile 4a, 4b has two output lines for outputting separate control signals. Each tile 4a, 4b has a first output line 141a,b for outputting a control signal $C_0$, and a second output line 142a,b for outputting a control signal $C_1$. The output lines 141a, 141b each connect to the one of the multiplexers 227a, 227b that is on the same die 810a,b as the tile 4 associated with the respective output line. The output lines 142a, 142b each divide into two paths, one of which connects to the other of the two die 810a, 810b and the other of which is unconnected to another die.

When tile 4a asserts a signal $C_0$ on output line 141a, this signal is delivered to its own multiplexer 227a so as to cause the input of multiplexer 227a to be selected for receiving data from tile 4a. On the other hand, when tile 4a asserts signal $C_1$ on output line 142a, this signal is delivered over path 143a and path 144a. Path 143a connects to the top of the die 810a and, since die 810a is the top of the two die 810a, 810b is not used for transmitting control signals further. The control signal travels over path 144a through the TSV 145a to be received at the multiplexer 227b, so to cause the relevant input of multiplexer 227b to be selected for receiving data from tile 4a.

When tile 4b asserts a signal $C_0$ on output line 141b, this signal is delivered to its own multiplexer 227b, so as to cause the input of multiplexer 227b to be selected for receiving data from tile 4b. On the other hand, when tile 4b asserts signal $C_1$ on output line 142b, this signal is delivered over path 143b and path 144b. Path 144b connects to the bottom metal layer of the die 810b and, since die 810b is the bottom of the two die 810a, 810b, is not used for transmitting control signals further. The control signal travels over path 143b through the TSV 145b to be received at the multiplexer 227a, so to cause the input of multiplexer 227a to be selected for receiving data from tile 4b.

Embodiments may be implemented in a device comprising more than two stacked die. In this case, at least one die will be provided between two die, such that all of its connection wires, both to the die above and the die below, will be connected and used.

Reference is made to FIG. 15, which illustrates an example device 150 comprising a first die 151a comprising a first component 152a, a second die 151b comprising a second component 152b, and a third die 151c comprising a third component 152c. Each of the components 152a-c has an associated output bus 153a-c for outputting data from that component 152a-c. Each output bus 153a-c divides into two output paths, the two output paths being a first output path 154a-c and a second output path 155a-c. Each first output path 154a-c connects to the top of the respective die 151a-c, and each second output path 155a-c connects to the bottom metal layer of the respective die 151a-c. When any of the components 152a-c sends data on its bus 153a-c, that data is sent over both the associated first output path 154a-c and associated second output path 155a-c. For the top die 151a only the second output path 155a is connected for sending data. However, the data sent on this one path 155a is broadcast to both die 151b-c. For the middle die 151b, both output paths 154b, 155b are connected for sending data, with path 154b providing data to die 151a and path 155b providing data to die 151c. When the second component 152b transmits data on output bus 153b, this data is broadcast to both die 151a,c. For the bottom die 151c only the first output path 154c is connected for sending data. However, the data sent on this one path 154c is broadcast to both die 151a-b.

Each die 151a-c comprises four input paths, a first input path 157a-c for receiving data from a die that is two die above the respective die 151a-c, a second input path 158a-c for receiving data from a die that is two die below the respective die 151a-c, a third input path 156a-c for receiving data from a die immediately above the respective die 151a-c, and a fourth input path 159a-c for receiving data for receiving data from a die immediately below the respective die 151a-c. It would be appreciated from the structure of the device 150 that, for each die 151a-c, only two of these input paths will be used for receiving data (by virtue of being connected to another die's 151a-c output bus 153a-c). For example, for die 151a, data may be received on input path 159a—where that data has been sent by the second component 152b on die 151b—or may be received on input path 158a, where that data has been sent from component 152c on die 151c. However, data cannot be received on input paths 156a, 157a since these do not connect to a die above die 151a, but terminate at the top of die 151a. For die 151b, data may be received on input path 156b—where that data has been sent from the first component 152a on die 151a—or may be received on input path 159b—where that data has been sent from the third component 152c on die 151c. However, data cannot be received on input path 157b, since this does not connect to a die that is two die above die 151b, but terminates (by virtue of connection to input path 156a) at the top of die 151a. Furthermore, data can be received on input path 158b, since this does not connect to a die that is two die below die 151b, but terminates (by virtue of connection to input path 159c) at the bottom metal layer of die 151c. For die 151c, data may be received on input path 156c—where that data has been sent by the second component 152b on die 151b—or may be received on input path 157c, where that data has been sent from component 152a on die 151a. However, data cannot be received on input paths 155c, 159c since these do not connect to a die below die 151c, but terminate at the bottom metal layer of die 151c.

Each die 151a-c therefore can receive data from either of the other two of the die 151a-c. The data may be provided directly to the respective component 152a-c, as in the examples of FIGS. 12A and 12B, or may be provided over a switching fabric 34 as in the example of FIG. 13.

Figure 16:
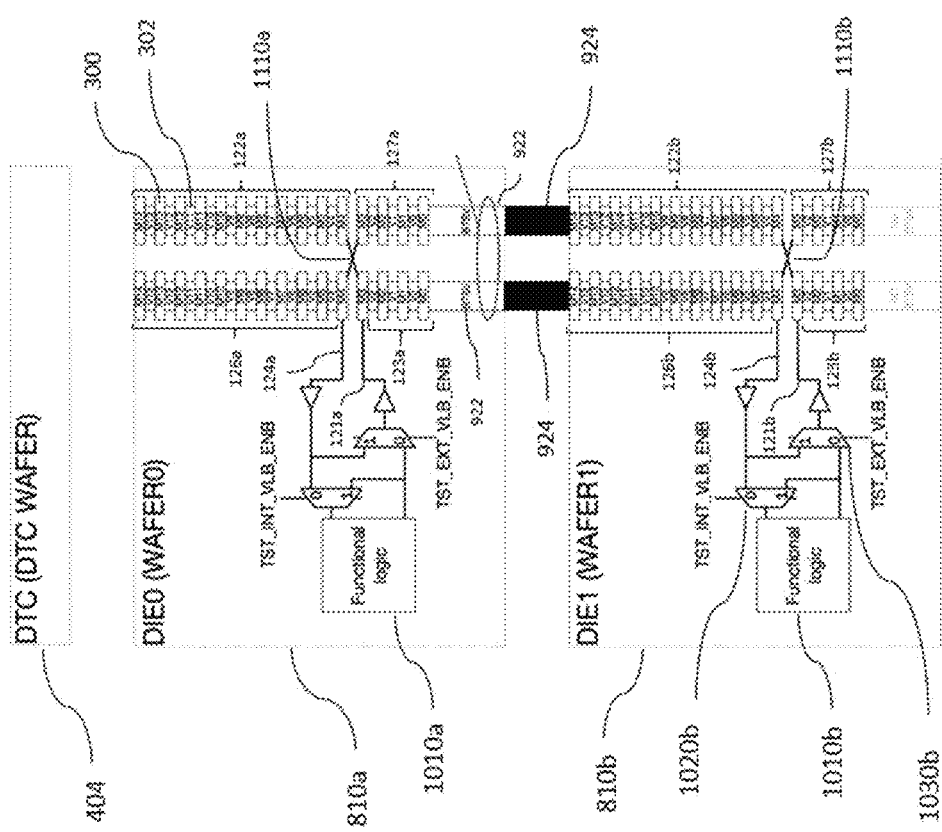
FIG. 16 illustrates the connections formed between the die using a cross-over IOs approach.

Reference is made to FIG. 16, which illustrates an example of the physical arrangement of the wiring in the stacked integrated circuit device 800 discussed above. In FIG. 16, the components 1010a,b are shown as functional logic 1010a,b. FIG. 16 additionally shows multiplexers connected to the input buses 124a,b and output buses 121a,b of each of the components 1010a,b. These multiplexers, which are not to be confused with multiplexers 125a-d shown in FIG. 12B, are for selecting whether an internal loopback mode (in which data is returned to the component 1010a,b that sent the data without that data being sent to the other die 810a,b) is enabled or whether data is sent to the other die 810a,b. In at least some embodiments, these multiplexers are optional and may be omitted.

In FIG. 16, it is shown that the output bus 121a divides into two paths 122a, 123a. For each of these paths 122a, 123a, a plurality of metal layers 300 and via layers 302 are shown through which the sets of wires for each of paths 122a, 123a are formed. Similarly, it is shown that the input bus 124a divides into two paths 126a, 127a, for which the metal and via layers in which the paths are formed is shown. There is a cross-over point 1110a in the die 810a at which the two pairs of wires cross over one another. The result of the cross-over is that the bottom of the input path 127a is located further from the component 1010a than the bottom of the output path 123a, even though the top of the input path 126a (which is electrically connected to input path 127a) is located closer to the component 1010a than the top of output path 122a (which is electrically connected to output path 123a).

The same structure as shown on the first die 810a is also present in the second die 810b. In particular, it is shown that the output bus 121b divides into two paths 122b, 123b. For each of these paths 122b, 123b, a plurality of metal layers 300 and via layers 302 are shown through which the sets of wires for each of paths 122b, 123b are formed. Similarly, it is shown that the input bus 124b divides into two paths 126b, 127b, for which the metal and via layers in which the paths are formed is shown. There is a cross-over point 1110b in the die 810b at which the two pairs of wires cross over one another. The result of the cross-over is that the bottom of the input path 127b is located further from the component 1010b than the bottom of the output path 123b, even though the top of the input path 126b (which is electrically connected to input path 127b) is located closer to the component 1010b than the top of output path 122b (which is electrically connected to output path 123b).

By having the pairs of connections cross over one another in this way, it may be ensured that the input path 127a aligns and connects to the output path 122b on the other die for receiving data at component 1010a from component 1010b. Similarly, it may be ensured that output path 123a aligns and connects to input path 126b for sending data from component 1010a to component 1010b. This alignment is attained since, within each die 810a,b, the end of the path 126a,b at the top of die 810a,b is at the same position in the horizontal dimensions as the end of path 123a,b at the bottom metal layer of the die 810a,b. Furthermore, within each die 810a,b, the end of the path 122a,b at the top of die 810a,b is at the same position in the horizontal dimensions as the end of path 127a,b at the bottom metal layer of the die 810a, b.

FIGS. 17A and 17B show a schematic diagram illustrating an integrated circuit device comprising four stacked die. Note that the 20 through silicon vias (TSVs) 630 at the bottom of FIG. 17A are connected to the 20 TSVs 630 at the top of FIG. 17B. The four stacked die in the example have been separated onto different pages for clarity. It will be appreciated that the architecture of FIGS. 17A and 17B is equivalent to that of FIGS. 13 and 14, extended to include four stacked die in a vertical alignment, instead of two die as in FIGS. 13 and 14.

Each die 172*a*, 172*b*, 172*c*, 172*d* is shown to include a respective tile 170*a*, 170*b*, 170*c*, 170*d*. The tiles 170*a*, 170*b*, 170*c*, 170*d* may be considered 'mirror' or 'corresponding' tiles, as described previously herein. Each of the tiles 170*a*, 170*b*, 170*c*, 170*d* comprises an output data bus 225 for sending data packets via an exchange bus 218 to a corresponding switching fabric 174*a*, 174*b*, 174*c*, 174*d* on the same die, so as to send data packets to other tiles on their own die 172. For example, tile 170*a* on die 172*a* comprises an output data bus 225 for sending data packets via an exchange bus 218 to the switching fabric 174*a*, so as to send data packets to other tiles on die 172*a*. Note that each output data bus 225 may be a multi-bit data bus, for 30 example a 32-bit data bus comprising 32 wires.

In addition to the output data buses 225 for sending and receiving data packets from tiles 170 of their own die 172, each of the tiles 170 is associated with four sets of inter-die data connections 219 for sending and receiving data packets with a corresponding tile 170 on one of the other dies 172. For example, the tile 170*a* is associated with four inter-die data connection wires 219 enabling it to send and receive data packets to the switching fabric 174*a*-174*d* of 5 any of the four die 172*a*-172*d* via the corresponding output exchange bus 218. Note that each inter-die connection may be a multi-bit data bus; for example, each inter-die connection 219 may be 32-bits wide, therefore comprising 32 wires. Note also that such a set of inter-die connections 219 exists for all tiles 170 on all die 172. That is, in the example of FIGS. 17A and 17A, every tile 170 on every die 172 as associated with four inter-die connections 219 (each comprising, for example, 32 wires), which enables any tile 170 to send data packets to the switching fabric 174 of any of the other die 172.

A multiplexer 227 is provided for each of the tiles 4 in each die 172. Each such multiplexer 227 has, as its output, the exchange output bus 218 of its associated tile 170. In dependence upon a control signal supplied to the multiplexer 227, the multiplexer 227 may supply either a 15 data packet output from its associated tile 170 or data output by one of the associated tile's corresponding tiles 170 on one of the other dies 172. That is, dependent on a control signal received to the multiplexer 227, the multiplexer 227 on die 172*a* may supply a data packet output (on the exchange output bus 218 to the corresponding switching fabric 174*a*) received from the associated tile 170*a* on the same die 172*a*, or may supply a data packet output received from one of the tiles 170*b*, 170*c*, 170*d* that correspond to (i.e. are 'mirror' tiles to) the tile 170*a* that is associated with the multiplexer 227 on the die 172*a*.

The control signal that controls each multiplexer 227 is supplied by the tile 170 from which the data packet supplied to the multiplexer 227 is received. Each tile 170 on each die 172 comprises a set of control signal wires 223, each tile 170 having a control signal wire 223 corresponding to each multiplexer 227 on each die 172. Note that the control signal wires are single wires, not multi-bit data buses. In the example of FIGS. 17A and 17B, each tile 170 therefore comprises four control signal wires 223: one to control the multiplexer 227 on the same die 172 as the tile 170, and one further control signal wire 223 for each of the three other dies 172. Each tile 170 is therefore able to send data packets to a multiplexer 227 associated with a corresponding tile 170 on a different die 172, or to the associated multiplexer 227 on the same die 172, and is able to control the multiplexer so as to select the multiplexer 227 input corresponding to the tile 170 which is sending the data packet.

For example, suppose that tile 170*a* has data to send to a tile on die 172*c*. The tile 170*a* asserts a signal on the appropriate control signal wire 223. The asserted signal controls the multiplexer 227 associated with tile 170*c* so as to select the input connected to the inter-die connection wire 219 of tile 170*a*. At the same time, tile 170*a* sends the data packet via its set of wires 219 to the selected input of the multiplexer 227 on die 172*c*. When the data packet arrives at the multiplexer 227 of die 172*c*, the data is output onto the output exchange bus 218 associated with the tile 170*c* and thereby delivered over the switching fabric 174*c* to one or more of the tiles on die 172*c*.

In FIGS. 17*a* and 17*b*, all control signals are sent on control signal wires 223 through TSVs 630 to all of the die 172.

Note that, for an architecture comprising four stacked die, four sets of TSVs 630 are required. Each set of TSVs 630 includes an inter-die connection bus 219 for carrying data packets to the input of each multiplexer 227 on each die 172, and a further four control signal wires 223 for controlling multiplexers 227 on each of the four die 172. Therefore, there are five TSVs in each set of TSVs 630, and there are four sets of TSVs 630. This equates to 20 TSVs 630 between 15 each die 172, as shown in FIGS. 17*a* and 17*b*.

In general, for a stack of DD die and a bus width BB, the number of TSVs 630 required between stacked tiles by the scheme pictured in FIGS. 17B and 17B (for 4 dies) and FIGS. 13 and 14 (for 2 dies) is NN=DD(BB+DD).

Note that in the example of FIGS. 17B and 17B, BB=1 and DD=2, giving NN=20. Note that the same equation applied to the example of FIGS. 13 and 14 gives NN=6. Only four TSVs 630 are shown in the left-side half of FIG. 6, though it will be appreciated that this is because the control wires from each tile 4 to the multiplexer 227 associated with that tile (on the same die) are not shown.

Those skilled in the art will appreciate that other aspects of the description of FIG. 6 may be applied to an architecture comprising four stacked die.

Figure 18:
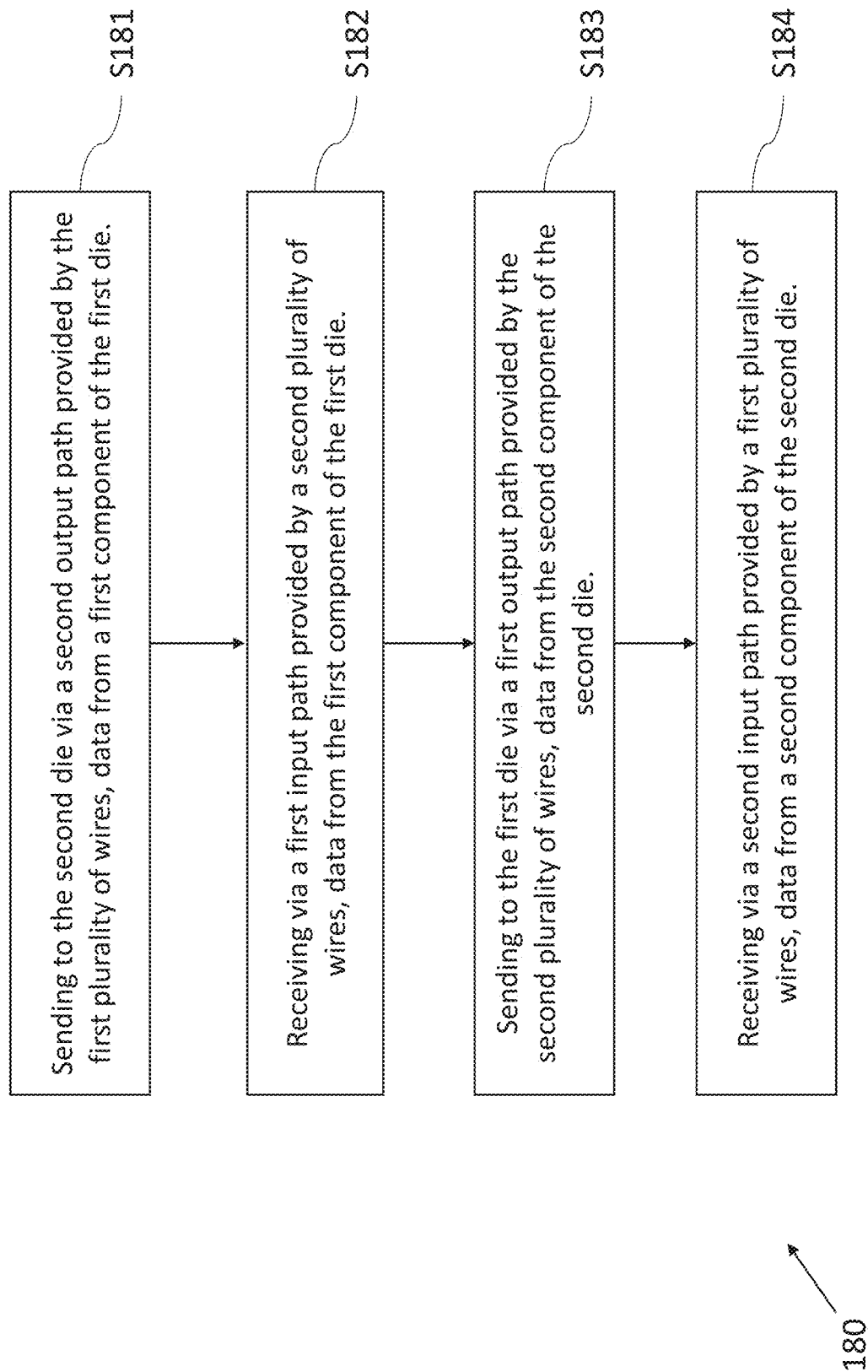
FIG. 18 illustrates a method according to embodiments of the application.

Reference is made to FIG. 18, which illustrates an example of a method 180 according to example embodiments. The method 180 may be implemented in any of devices 800, 150, 170 discussed above.

At S181, a first die (e.g. the top die) in the device sends to a second die (e.g. the bottom die) in the device, data from a first component of the first die. This data is sent on a second output path (e.g. 123*a*) provided by a first plurality of wires (e.g. wires 122*a*, 123*a*, 127*a*, 126*a*) in the first die.

At S182, the second die receives data (which may be same as the data sent in S181) from the first component of the first die. The data is received via a first input path (e.g. 126*b*) provided by a second plurality of wires (e.g. wires 122*b*, 123*b*, 127*b*, 126*b*) in the second die.

At S183, a second die sends to a first die, data from a second component of the second die. This data is sent on a first output path (e.g. 122*b*) provided by the second plurality of wires in the second die.

At S184, the first die receives data (which may be same as the data sent in S183) from the second component of the second die. The data is received via a second input path (e.g. 127*a*) provided by the first plurality of wires in the first die.

While particular embodiments have been described, other applications and variants of the disclosed techniques may become apparent to a person skilled in the art once given the disclosure herein.

It will be appreciated that the above embodiments have been described by way of example only.

The invention claimed is:

1. A stacked integrated circuit device comprising a plurality of die, wherein each of two or more of the plurality of die comprises:
a plurality of metal layers;
a component; and
a plurality of connections associated with the component, the plurality of connections comprising:
a first input path connecting to a top of the plurality of metal layers of a respective die;
a second input path connected to a bottom of the plurality of metal layers of the respective die;
a first output path connected to the top of the plurality of metal layers of the respective die;
a second output path connected to the bottom of the plurality of metal layers of the respective die;
wherein for a first die of the two or more die:
the first input path is unconnected to a further one of the two or more die, so as to be inoperable for receiving data from any of the two or more die;
the second input path provides a connection to the second die for receiving data from the component of the second die;
the first output path is unconnected to a further one of the two or more die, so as to be inoperable for sending data to any of the two or more die; and
the second output path provides a connection to the second die for sending data from the component of the first die to the second die;
wherein for a second die of the two or more die:
the first input path provides a connection to the first die for receiving data from the component of the first die;
the second input path is unconnected to a further one of the two or more die, so as to be inoperable for receiving data from any of the two or more die;
the first output path provides a connection to the first die for sending data from the component of the second die to the first die; and
the second output path is unconnected to a further one of the two or more die, so as to be inoperable for sending data to any of the two or more die.

2. The stacked integrated circuit device of claim 1, wherein each of the two or more die comprises an output bus associated with the component of the respective die and connected to the first output path and the second output path of the respective die, wherein each of the components is operable to broadcast data to others of the two or more die by transmitting that broadcast data on its output bus.

3. The stacked integrated circuit device of claim 1, wherein each of the two or more die comprises a multiplexer controlled by a die identifier signal for the respective die, so as to select between the respective first input path and the respective second input path.

4. The stacked integrated circuit device of claim 1, wherein each of the two or more die comprises a multiplexer controlled by a die identifier signal for the respective die, so as to select between the respective first output path and the respective second output path.

5. The stacked integrated circuit device of claim 4, wherein each of the two or more die comprises one of a plurality of circuits and each of the circuits is configured to:
receive a first signal for the respective die, the first signal for the respective die being received from a source external to the respective die; and
modify the first signal to produce a second signal for the respective die,
wherein for each of the two or more die, the die identifier signal for that die is one of:
the respective first signal received by the circuit of that die; or
the second signal output by the circuit of that die.

6. The stacked integrated device of claim 5, wherein each of the circuits comprises an invertor.

7. The stacked integrated circuit of claim 5, wherein the plurality of die comprises a further die connected to the top surface of the first die, wherein the circuit of the first die is configured to receive the first signal for the first die from the further die.

8. The stacked integrated circuit device of claim 1, wherein the two or more die comprises a third die provided between the first die and the second die, wherein for the third die:
the first input path provides a connection to the first die for receiving data from the first die;
the second input path provides a connection to the second die for receiving data from the second die;
the first output path provides a connection to the first die for sending data to the first die; and
the second output path provides a connection to the second die for sending data to the second die.

9. The stacked integrated circuit device of claim 8, wherein the plurality of connections further comprises:
a third input path connected to the top metal layer of the respective die; and
a fourth input path connected to the bottom metal layer of the respective die,
wherein for the first die, the fourth input path is used for receiving data from the component of the third die,
wherein for the second die, the third input path is used for receiving data from the component of the third die.

10. The stacked integrated circuit device of claim 1, wherein, for each of the two or more die, the plurality of connections are provided in a same layout.

11. The stacked integrated circuit device of claim 1, wherein for the first die, the second input path is connected to the component of the first die for providing data to the component of the first die from the component of the second die, wherein for the second die, the first input path is connected to the component of the second die for providing data to the component of the second die from the component of the first die.

12. The stacked integrated circuit device of claim 1, wherein the first die and the second die each comprise a multi-tile processor, wherein for the first die and the second die:
the respective component is one of the tiles of the multi-tile processor of that die; and
each of the tiles of the multi-tile processor of that die is associated with an instance of the plurality of connections enabling it to communicate with another of the first die and the second die.

13. The stacked integrated circuit device of claim 1, wherein each of the two or more die comprises a multiplexer configured to select between outputting data from another of the two or more die or the component of the respective die to which it belongs,
wherein the multiplexer of the first die is configured to receive the second input path as input,
wherein the multiplexer of the second die is configured to receive the first input path as an input.

14. The stacked integrated circuit device of claim 13, wherein each of the multiplexers is configured to outputs the data to a switching fabric of the respective die.

15. The stacked integrated circuit device of claim 13, wherein each of the multiplexers is configured to be controlled to select between outputting data from another of the two or more die or the component of the respective die to which it belongs in dependence upon control signals received from each of the components.

16. The stacked integrated circuit device of claim 1, wherein for each of the two or more die, the plurality of connections are arranged such that:
- a position of the first input path at the top surface of the respective die is aligned horizontally with a position corresponding to an end of the second output path at the bottom metal layer of the respective die; and
- a position of the first output path at the top surface of the respective die is aligned horizontally with a position of the second input path at the bottom metal layer of the respective die.

17. An integrated circuit device comprising:
a first die in a stacked arrangement with a second die, the first die comprising a first plurality of metal layers, a first component, and a first plurality of connections associated with the first component, the first plurality of connections comprising:
- a first input path connecting to a top of the first plurality of metal layers, wherein the first input path is unconnected to the second die, so as to be inoperable for receiving data from the second die;
- a second input path connected to a bottom of the first plurality of metal layers, wherein the second input path is configured to provide a connection to the second die for receiving data from a second component of the second die;
- a first output path connected to the top of the first plurality of metal layers, wherein the first output path is unconnected to the second die, so as to be inoperable for sending data to the second die; and
- a second output path connected to the bottom of the first plurality of metal layers, wherein the second output path is configured to connect to the second die for sending data from the first component to the second die;

wherein the second die comprises:
- a third input path configured to connect to the first die for receiving data from the first component;
- a fourth input path that is unconnected to the first die, so as to be inoperable for receiving data from the first die;
- a third output path configured to connect to the first die for sending data from the second component to the first die; and
- a fourth output path that is unconnected to the first die, so as to be inoperable for sending data to the first die.

18. The integrated circuit device of claim 17, wherein the first die comprises an output bus associated with the first component and connected to the first output path and the second output path, wherein the first component is configured to broadcast data on the output bus.

19. The integrated circuit device of claim 17, wherein the first die comprises:
- a first multiplexer controlled by a die identifier signal for the first die, so as to select between the first output path and the second output path; and
- a second multiplexer controlled by the die identifier signal, so as to select between the first input path and the second input path.

20. The integrated circuit device of claim 19, wherein the first die comprises an invertor that is configured to:
- receive a first signal for the first die, the first signal for the first die being received from a source external to the first die; and
- modify the first signal to produce a second signal for the first die, wherein the die identifier signal comprises the first signal or the second signal.

21. The integrated circuit device of claim 20, further comprising:
- a third die connected to a top surface of the first die, wherein the first component is configured to receive the first signal from the third die.

22. The integrated circuit device of claim 17, further comprising a third die in the stacked arrangement between the first die and the second die, wherein the third die comprises:
- a fifth input path configured to connect to the first die for receiving data from the first die;
- a sixth input path configured to connect to the second die for receiving data from the second die;
- a fifth output path configured to connect to the first die for sending data to the first die; and
- a sixth output path configured to connect to the second die for sending data to the second die.

23. The integrated circuit device of claim 17, wherein for the first die, the second input path is connected to the first component for providing data to the first component from the second processor component, wherein for the second die, the third input path is connected to the second component for providing data to the second component from the first component.

24. The integrated circuit device of claim 17, wherein the first component is a multi-tile processor having a plurality of tiles, each of the tiles of the multi-tile processor being associated with an instance of the first plurality of connections to communicate with the second die.

25. The integrated circuit device of claim 17, wherein the first die comprises a first multiplexer configured to select between outputting data from the second die or outputting data from the first component, wherein the first multiplexer is configured to receive the second input path as input,
wherein the second die comprises a second multiplexer configured to select between outputting data from the first die or outputting data from the second component, wherein the second multiplexer is configured to receive the third input path as an input.

26. The integrated circuit device of claim 25, wherein the first multiplexer and the second multiplexer are configured to output data to a switching fabric.

27. The integrated circuit device of claim 17, wherein for the first die, the first plurality of connections are arranged such that:
- a position of the first input path at a top surface of the first die is aligned horizontally with a position corresponding to an end of the second output path at a bottom metal layer of the first die; and
- a position of the first output path at the top surface of the first die is aligned horizontally with a position of the second input path at the bottom metal layer of the first die.

* * * * *